US011671853B2

(12) United States Patent
Sugaya et al.

(10) Patent No.: US 11,671,853 B2
(45) Date of Patent: *Jun. 6, 2023

(54) WIRELESS COMMUNICATION APPARATUS AND METHOD, AND PROGRAM

(71) Applicant: Sony Group Corporation, Tokyo (JP)

(72) Inventors: Shigeru Sugaya, Kanagawa (JP); Yuichi Morioka, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/739,163

(22) Filed: May 9, 2022

(65) Prior Publication Data

US 2022/0264336 A1  Aug. 18, 2022

Related U.S. Application Data

(63) Continuation of application No. 16/650,868, filed as application No. PCT/JP2018/034353 on Sep. 18, 2018, now Pat. No. 11,337,085.

(30) Foreign Application Priority Data

Oct. 2, 2017 (JP) .............................. JP2017-192382

(51) Int. Cl.
*H04W 24/02* (2009.01)
*H04W 16/02* (2009.01)
(Continued)

(52) U.S. Cl.
CPC ........... *H04W 24/02* (2013.01); *H04W 16/02* (2013.01); *H04W 16/14* (2013.01);
(Continued)

(58) Field of Classification Search
CPC ..... H04W 24/02; H04W 16/02; H04W 16/14; H04W 72/0453; H04W 52/04; H04W 84/12
(Continued)

(56) References Cited

U.S. PATENT DOCUMENTS

| 7,164,674 B2 | 1/2007 | Shpak |
| 2017/0272295 A1 | 9/2017 | Lee et al. |
| 2017/0279864 A1 | 9/2017 | Chun et al. |

FOREIGN PATENT DOCUMENTS

| CN | 103563283 A | 2/2014 |
| CN | 105659550 A | 6/2016 |

(Continued)

OTHER PUBLICATIONS

International Search Report and Written Opinion dated Nov. 27, 2018 for PCT/JP2018/034353 filed on Sep. 18, 2018, 6 pages including English Translation of the International Search Report.

(Continued)

*Primary Examiner* — Gbemileke J Onamuti
(74) *Attorney, Agent, or Firm* — Xsensus LLP

(57) ABSTRACT

The present technology relates to a wireless communication apparatus and method, and a program which enable communication to be performed more efficiently.
The wireless communication apparatus includes a preamble generating unit configured to generate a preamble signal including header information, an inter-training generating unit configured to generate an inter-training signal including at least part of information of the header information, and a wireless transmission processing unit configured to transmit transmission data after transmitting the preamble signal in at least one or more frequency channels among a plurality of the frequency channels and transmit a plurality of the inter-training signals by utilizing one or a plurality of the frequency channels among the plurality of the frequency (Continued)

channels during a transmission period of the transmission data. The present technology can be applied to a wireless communication apparatus.

20 Claims, 16 Drawing Sheets

(51) Int. Cl.
- *H04W 16/14* (2009.01)
- *H04W 72/04* (2023.01)
- *H04W 72/0453* (2023.01)
- *H04W 52/04* (2009.01)
- *H04W 84/12* (2009.01)

(52) U.S. Cl.
CPC ........ *H04W 72/0453* (2013.01); *H04W 52/04* (2013.01); *H04W 84/12* (2013.01)

(58) Field of Classification Search
USPC .......................................... 370/329
See application file for complete search history.

(56) References Cited

FOREIGN PATENT DOCUMENTS

| | | |
|---|---|---|
| CN | 105659552 A | 6/2016 |
| CN | 105790894 A | 7/2016 |
| JP | 2004-235752 A | 8/2004 |
| JP | 2013-153460 A | 8/2013 |
| JP | 2014-525714 A | 9/2014 |
| RU | 2468520 C2 | 11/2012 |
| RU | 2470493 C2 | 12/2012 |
| TW | 201713086 A | 4/2017 |
| WO | 2004/075455 A2 | 9/2004 |
| WO | WO-2016126077 A2 | 8/2016 |
| WO | WO-2016167608 A1 | 10/2016 |
| WO | WO-2016167609 A1 | 10/2016 |
| WO | 2017/078442 A1 | 5/2017 |

OTHER PUBLICATIONS

Zhang, H. et al., "Doppler discussions," Retrieved from the Internet URL: https://mentor.ieee.org/802.11/dcn/17/11-17-0734-01-00ax-doppler-discussions.pptx, May 10, 2017, 26 pages.

FIG. 6

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|---|---|---|---|---|---|---|
| RATE | | | | R | | | | | | LENGTH | | | | | | P | | Tail | | | | | |

L-SIG

FIG. 7

| Bits | HE-SIG-A1 HE SU PPDU/HE extended range SU PPDU | Bits | HE-SIG-A2 HE SU PPDU/HE extended range SU PPDU |
|---|---|---|---|
| 25 | Nsts | 25 | Tail |
| 24 | | 24 | |
| 23 | | 23 | |
| 22 | GI+TF Size | 22 | |
| 21 | | 21 | |
| 20 | Bandwidth | 20 | |
| 19 | | 19 | CRC |
| 18 | Spatial Reuse | 18 | |
| 17 | | 17 | |
| 16 | | 16 | |
| 15 | | 15 | Doppler |
| 14 | Reserved | 14 | Reserved |
| 13 | | 13 | PE Disambiguity |
| 12 | BSS Color | 12 | Pre-FEC Padding Factor |
| 11 | | 11 | |
| 10 | | 10 | Tx BF |
| 9 | | 9 | STBC |
| 8 | | 8 | LDPC Extra Sym |
| 7 | DCM | 7 | Coding |
| 6 | MCS | 6 | TXOP Duration |
| 5 | | 5 | |
| 4 | | 4 | |
| 3 | | 3 | |
| 2 | UL/DL | 2 | |
| 1 | Beam Change | 1 | |
| 0 | Format | 0 | |

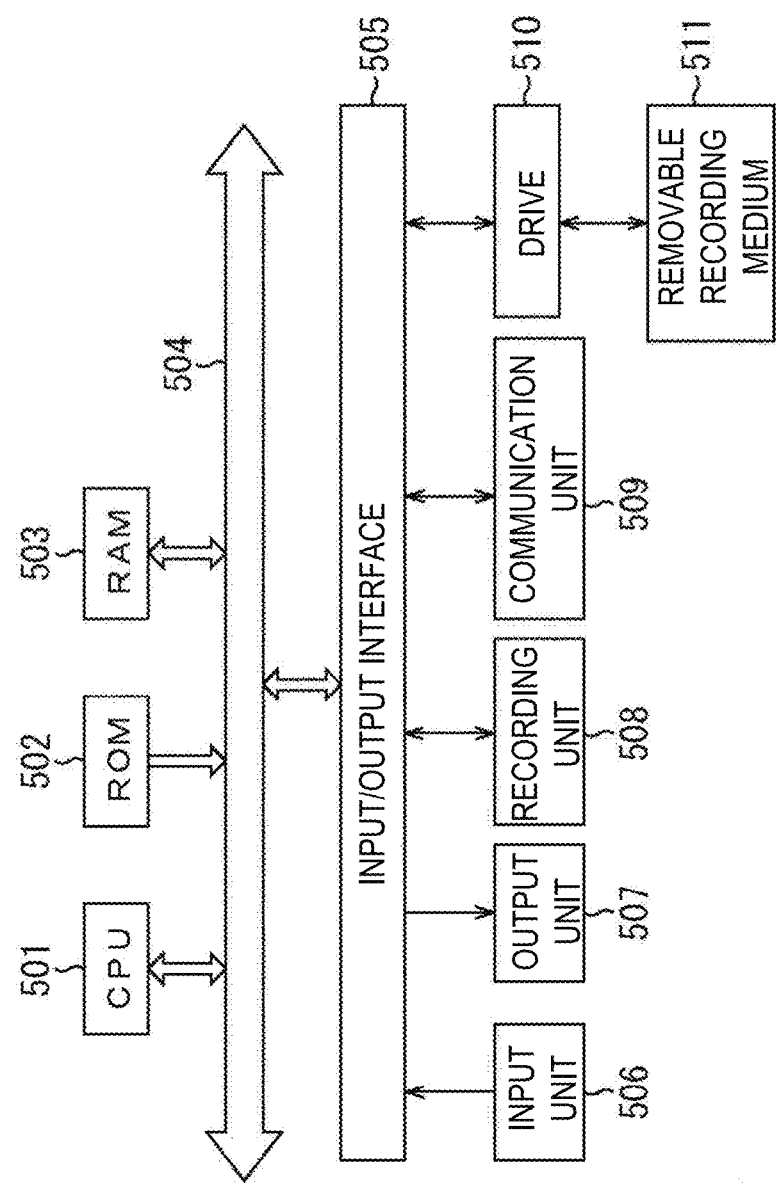

WIRELESS COMMUNICATION APPARATUS AND METHOD, AND PROGRAM

CROSS-REFERENCE TO RELATED APPLICATIONS

The present application is a continuation of U.S. application Ser. No. 16/650,868, filed Mar. 26, 2020, which is based on PCT filing PCT/JP2018/034353, filed Sep. 18, 2018, which claims priority to JP 2017-192382, filed Oct. 2, 2017, the entire contents of each are incorporated herein by reference.

TECHNICAL FIELD

The present technology relates to a wireless communication apparatus and method, and a program, and, more particularly, to a wireless communication apparatus and method, and a program which enable communication to be performed more efficiently.

BACKGROUND ART

In recent years, a high-density wireless local area network (LAN) system has been studied and developed, and a method has been devised, to which an advanced spatial reuse technology which improves capacity of wireless LAN terminals in related art and realizes high throughput is applied.

Particularly, as the advanced spatial reuse technology, a technology for allowing a signal of an own basic service set (BSS) and a signal from an overlapping basic service set (OBSS) existing close to the own BSS to coexist has been devised.

Specifically, for example, a communication method has been devised in which transmission of an own signal is performed within a range not affecting the OBSS if received field strength (received power) of a signal from the OBSS close to the own BSS is equal to or lower than predetermined received field strength. Here, whether a signal is a signal from the own BSS or a signal from other OBSS is typically identified on the basis of an identifier included in header information added to a head of a frame.

Further, in a cellular communication system in related art, existence of data transmitted using a data channel can be recognized by arranging a control channel and the data channel separately in advance and by a terminal decoding only control information transmitted using the control channel.

That is, for example, a technology of transmitting a signaling message using a shared signaling channel (see, for example, Patent Document 1) is proposed. In this technology, shared signaling channels are allocated to subcarriers of the number determined in advance within an arbitrary frame, actual subcarriers periodically change, and signal power is made to change on the basis of a baseband symbol.

CITATION LIST

Patent Document

Patent Document 1: Japanese Patent Application Laid-Open No. 2013-153460

SUMMARY OF THE INVENTION

Problems to be Solved by the Invention

However, with the technology described above, it is difficult to perform communication efficiently.

Specifically, in a case where an advanced spatial reuse technology is applied, whether a received signal is a signal from a BSS or a signal from an OBSS is determined on the basis of header information added to a head of a frame. Therefore, even if the received signal is a signal from the OBSS, if a head portion of the signal cannot be received, it has been impossible to identify whether the received signal is a signal of the BSS or a signal from the OBSS. As a result, an apparatus is put into a state where the apparatus cannot transmit an own signal, and it becomes impossible to cause the advanced spatial reuse technology to effectively function.

Further, even if some kind of signals is detected from a middle of a frame at a signal reception side, because information indicating a duration of the signal cannot be obtained, it has been impossible to recognize reception end time of the frame. Therefore, in order to start new signal transmission after a frame which is being detected ends, it is necessary to always continuously detect a signal level.

Further, in a method in which a signaling message is transmitted using a shared signaling channel, it is necessary to recognize in advance which subcarrier is used for signaling. Therefore, such a method cannot be applied to a system like a wireless LAN, in which signals are intermittently transmitted and received. That is, a communication apparatus which operates as a base station has to always continuously transmit a signaling message using some kind of subcarriers.

The present technology has been made in view of such circumstances, and is directed to enabling communication to be performed more efficiently.

Solutions to Problems

According to the first aspect of the present technology, there is provided a wireless communication apparatus including, a preamble generating unit configured to generate a preamble signal including header information; an inter-training generating unit configured to generate an inter-training signal including at least part of information of the header information, and a wireless transmission processing unit configured to transmit transmission data after transmitting the preamble signal in at least one or more frequency channels among a plurality of the frequency channels and transmit a plurality of the inter-training signals by utilizing one or a plurality of the frequency channels among the plurality of the frequency channels during a transmission period of the transmission data.

According to the first aspect of the present technology, there is provided a wireless communication method or program including steps of: generating a preamble signal including header information; generating an inter-training signal including at least part of information of the header information; and transmitting transmission data after transmitting the preamble signal in at least one or more frequency channels among a plurality of the frequency channels and transmitting a plurality of the inter-training signals by utilizing one or a plurality of the frequency channels among the plurality of the frequency channels during a transmission period of the transmission data.

In the first aspect of the present technology, a preamble signal including header information is generated, an inter-training signal including at least part of information of the header information is generated, and after transmitting the preamble signal in at least one or more frequency channels among a plurality of the frequency channels, transmission data is transmitted, and a plurality of the inter-training signals is transmitted by utilizing one or a plurality of the frequency channels among the plurality of the frequency channels during a transmission period of the transmission data.

According to the second aspect of the present technology, there is provided a wireless communication apparatus including: an inter-training detecting unit configured to detect an inter-training signal including at least part of information of header information included in a preamble signal from a received signal in one or a plurality of frequency channels among a plurality of the frequency channels; and a wireless communication control unit configured to specify usage situations of the plurality of the frequency channels on the basis of the detected inter-training signal.

According to the second aspect of the present technology, there is provided a wireless communication method or program including steps of: detecting an inter-training signal including at least part of information of header information included in a preamble signal from a received signal in one or a plurality of frequency channels among a plurality of the frequency channels; and specifying usage situations of the plurality of the frequency channels on the basis of the detected inter-training signal.

In the second aspect of the present technology, an inter-training signal including at least part of information of header information included in a preamble signal is detected from a received signal in one or a plurality of frequency channels among a plurality of the frequency channels, and usage situations of the plurality of the frequency channels is specified on the basis of the detected inter-training signal.

Effects of the Invention

According to the first aspect and the second aspect of the present technology, it is possible to perform communication more efficiently.

Note that the advantageous effects described here are not necessarily limitative, and any of the advantageous effects described in the present disclosure may be attained.

BRIEF DESCRIPTION OF DRAWINGS

FIG. 6 is a diagram illustrating a configuration example of an L-SIG.

FIG. 7 is a diagram illustrating a configuration example of an HE-SIG-A.

FIG. 16 is a diagram illustrating a configuration example of a computer.

MODE FOR CARRYING OUT THE INVENTION

Figure 1:
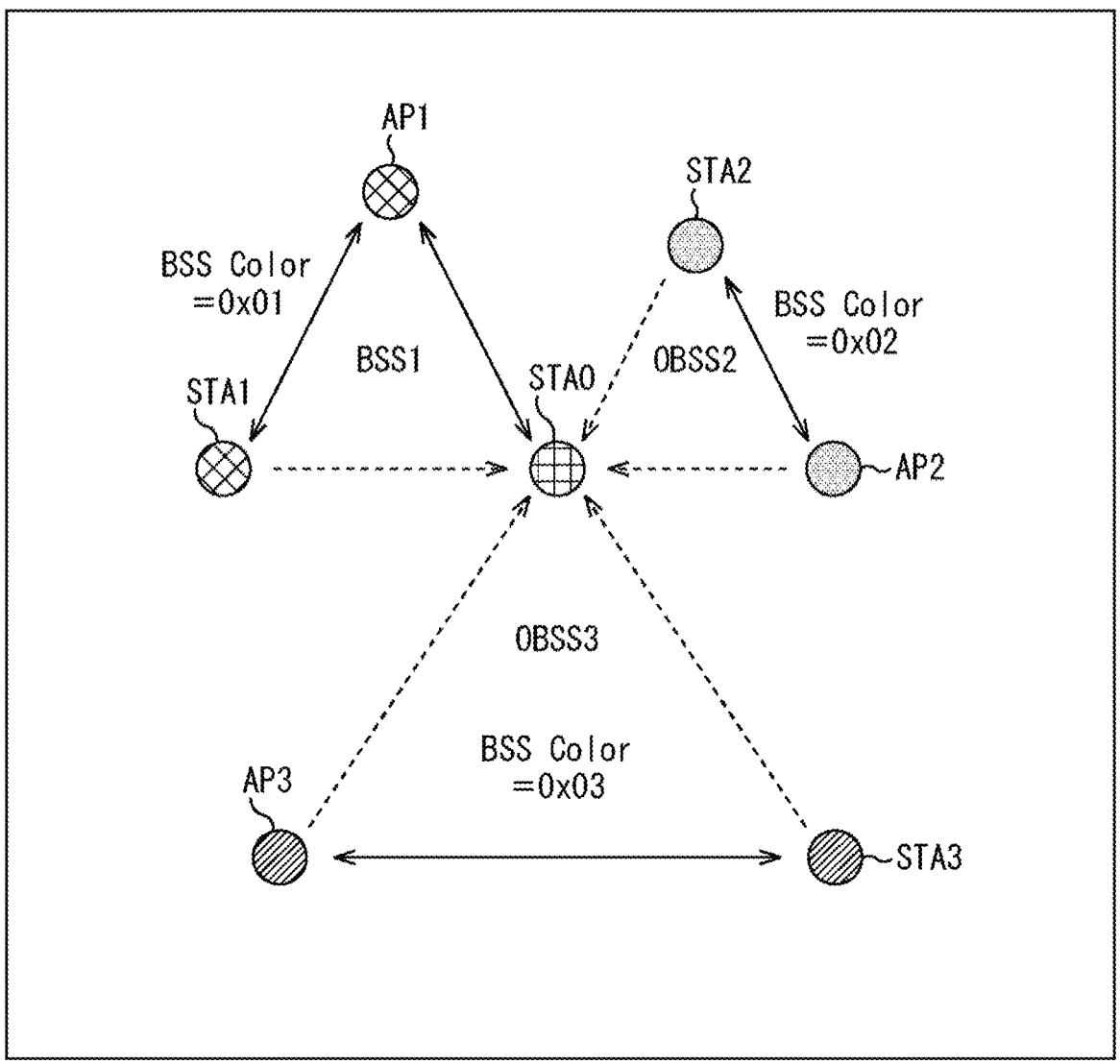
FIG. 1 is a diagram illustrating a configuration example of a wireless network.

Hereinafter, an embodiment to which the present technology is applied will be described with reference to the drawings.

First Embodiment

Configuration Example of Wireless Network

The present technology is a technology in which, in a case where a plurality of channels are aggregated (coupled) to be utilized as a broadband channel, part of preamble information and header information which make a notification of attribute of frames transmitted in other channels is transmitted in a specific narrow band channel.

By this means, it is possible to cause peripheral wireless communication apparatuses to recognize a usage situation of a wireless transmission path, so that it is possible to perform communication more efficiently. That is, the peripheral wireless communication apparatuses can recognize what kind of signal (frame) is transmitted in all channels by acquiring this part of the preamble information and the header information.

Specifically, a specific frequency channel is set as a management channel, and, in a case where a wireless transmission path is utilized, part of header information is repeatedly transmitted following a predetermined preamble in the management channel. Transmission of part of the header information which is repeatedly performed is continuously performed until a predetermined timing at which utilization of the wireless transmission path is finished.

In this case, for example, by setting a format of one of narrow band channels at a preamble format which utilizes a 20 MHz bandwidth in related art, also wireless communication apparatuses in related art can recognize the usage situation of the wireless transmission path. Further, by attribute information, or the like, of the frame being described as preamble information to be transmitted by utilizing a narrow band channel (management channel), peripheral wireless communication apparatuses can acquire information of the frame transmitted in a broadband channel.

Further, by shifting a frequency channel to be utilized as the management channel as necessary, it is also possible to allow a wireless communication apparatus which performs communication by utilizing a narrow band channel to be notified of the usage situation of the wireless transmission path.

In this case, because a notification of part of the preamble information and the header information is made by sequentially utilizing a plurality of narrow band channels which constitutes a broadband channel as the management channel, it is possible to notify also a wireless communication apparatus which utilizes only a narrow band channel of the usage situation of the wireless transmission path.

Further, in addition to part of the header information, arbitrary information may be added as information to be repeatedly transmitted in the management channel.

For example, examples of the information to be transmitted in the management channel can include BSS Color information which is identification information for identifying a BSS, information regarding transmission power (transmitter power control (TPC)), information regarding receiving sensitivity (DSC), information of a modulation scheme and a coding scheme of a data portion (modulation and coding scheme (MCS)), and parameters such as a remaining period of the frame and a data length (Length).

For example, by the BSS Color information being described as part of the header information, in a case where a spatial multiplex reuse technology is applied, each peripheral wireless communication apparatus can identify whether a signal which is being transmitted is a signal from a BSS to which an own apparatus belongs or signals from other OBSSs.

Further, by describing information regarding transmission power of a frame to be transmitted and information regarding receiving sensitivity on a reception side in part of the header information, it is possible to notify peripheral wireless communication apparatuses that transmission power control or receiving sensitivity control is performed.

A specific embodiment to which the present technology is applied will be described below. FIG. 1 is a diagram illustrating a configuration example of a wireless network including a wireless communication apparatus to which the present technology is applied.

In the example illustrated in FIG. 1, relationship between the wireless communication apparatus to which the present technology is applied and wireless communication apparatuses existing around the wireless communication apparatus is illustrated.

That is, a wireless communication apparatus STAG performs communication by forming a wireless network with an access point API of a first basic service set to which the wireless communication apparatus STA0 belongs, that is, a BSS (hereinafter, referred to as a BSS1) and another wireless communication apparatus STA1.

In other words, the wireless communication apparatus STA0, the access point AP1, and the wireless communication apparatus STA1 belong to the BSS1 which is a wireless network, and these apparatuses constitute a wireless communication system.

In this example, whether the detected signal is a signal transmitted from the apparatus which constitutes the BSS1 can be specified from the BSS Color information==0x01 indicating the BSS1, included in the signal. The BSS Color information is information for specifying a wireless network to which an apparatus of a transmission source of a signal including the BSS Color information belongs.

Further, around the wireless communication apparatus STA0, an access point AP2 and a wireless communication apparatus STA2 of a second BSS (hereinafter, referred to as an OBSS2) which exists around the wireless communication apparatus STA0 and which overlaps with the BSS1 also exist. Here, whether the detected signal is a signal transmitted from an apparatus which constitutes the OBSS2 can be specified from the BSS Color information=0x0 indicating the OBSS2, included in the signal.

Further, around the wireless communication apparatus STA0, an access point AP3 and a wireless communication apparatus STA3 of a third BSS (hereinafter, referred to as an OBSS3) which exists around the wireless communication apparatus STA0 and which overlaps with the BSS1 also exist. Here, whether the detected signal is a signal transmitted from an apparatus which constitutes the OBSS3 can be specified from the BSS Color information=0x03 indicating the OBSS3, included in the signal.

In this manner, in a case where the OBSS2 and the OBSS3 whose communication possible ranges overlap with a communication possible range of the BSS1 exist, for example, at the wireless communication apparatus STA0, not only signals transmitted from the access point AP1 and the wireless communication apparatus STA1 which constitute the BSS1, but also signals transmitted from apparatuses such as the access point AP2, the wireless communication apparatus STA2, the access point AP3, and the wireless communication apparatus STA3 are also detected.

A configuration is employed where each BSS of the BSS1, the OBSS2, and the OBSS3 performs transmission power control in accordance with a situation between wireless communication apparatuses which constitute the BSS to perform communication.

For example, in the OBSS2 which is constituted with the access point AP2 and the wireless communication apparatus STA2, and whose communication situation is more favorable than that of the BSS1, communication is performed while transmission power is lowered. Further, in the OBSS3 in which the access point AP3 and the wireless communication apparatus STA3 exist, and whose communication situation is poorer than that of the BSS1, communication is performed while transmission power is increased.

That is, each BSS employs a configuration where transmission power control is performed in accordance with wireless communication apparatuses which constitute the wireless network (BSS). Therefore, because communication is not performed at predetermined transmission power as in related art, and whether or not a transmission path can be utilized cannot be uniquely determined from received field strength (received power) of the received signal, it has been difficult to perform transmission control using carrier sense multiple access/collision avoidance (CSMA/CA).

Further, in recent years, it is studied to improve utilization efficiency of a wireless transmission path by, for example, upon communication between the access point AP3 and the wireless communication apparatus STA3 of the OBSS3, performing communication while controlling transmission power from the wireless communication apparatus STA0 to the access point AP1 so as not to affect the communication of the OBSS3.

That is, a configuration is employed where advanced spatial reuse is performed by performing communication while communication within the own BSS is made to overlap with communication of an irrelevant and overlapping BSS (OBSS).

However, because communication between the access point AP2 and the wireless communication apparatus STA2 of the OBSS2, which is performed at transmission power smaller than transmission power of the own BSS is largely affected if communication from the wireless communication apparatus STA0 to the access point AP1 is performed, it is necessary to perform control of refraining from transmission.

Configuration Example of Frequency Channels

Figure 2:
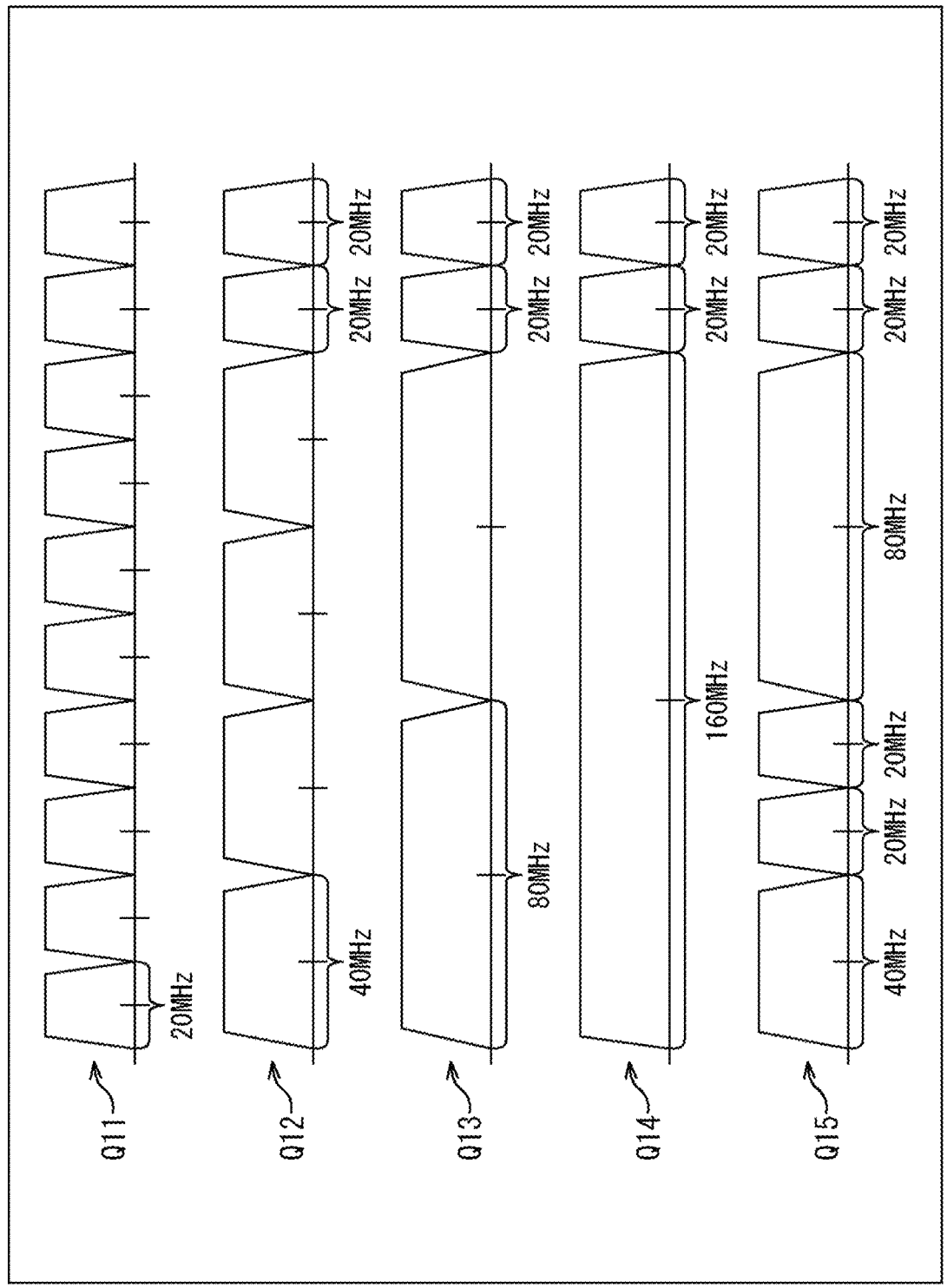
FIG. 2 is a diagram illustrating a configuration example of a frequency channel.

Subsequently, a configuration of frequency channels allocated to the wireless communication system will be described. FIG. 2 is a diagram illustrating a configuration example of the frequency channels allocated to the wireless communication system. Note that FIG. 2 illustrates a frequency on a horizontal axis.

For example, in an example indicated with an arrow Q11, in a predetermined frequency band, each frequency channel is set so that bandwidths of all the frequency channels become 20 MHz in the frequency band. That is, in this case, each frequency band whose bandwidth is 20 MHz is utilized as the frequency channel, and a signal is transmitted for each frequency channel.

In an example indicated with an arrow Q12, from the example indicated with the arrow Q11, further, two frequency channels whose bandwidths are 20 MHz are bundled for some frequency channels adjacent to each other, and utilized as one frequency channel whose bandwidth is 40 MHz, that is, as a broadband channel.

In this manner, by widening a bandwidth of the frequency channel, it is possible to transmit more information efficiently. That is, for example, because utilization efficiency of a frequency band is higher in a case where a signal (frame) is transmitted using one frequency channel whose bandwidth is 40 MHz than in a case where the signal is transmitted using two frequency channels whose bandwidths are 20 MHz, it is possible to transmit more information.

Moreover, because processing is performed for each frequency channel upon transmission and reception of a signal, as the number of frequency channels is smaller, a processing amount upon transmission and upon reception becomes smaller, which results in shortening a processing period of processing required for transmission and reception.

In an example indicated with an arrow Q13, from the example indicated with the arrow Q12, further, two frequency channels whose bandwidths are 40 MHz are bundled to be utilized as one frequency channel whose bandwidth is 80 MHz. That is, four frequency channels whose bandwidths are 20 MHz are bundled to be utilized as one frequency channel whose bandwidth is 80 MHz (broadband channel).

Therefore, in this example, it is possible to utilize two frequency channels whose bandwidths are 80 MHz and two frequency channels whose bandwidths are 20 MHz.

In an example indicated with an arrow Q14, from the example indicated with the arrow Q13, further, two frequency channels whose bandwidths are 80 MHz are bundled to be utilized as one frequency channel whose bandwidth is 160 MHz. That is, eight frequency channels whose bandwidths are 20 MHz are bundled to be utilized as one frequency channel whose bandwidth is 160 MHz. Therefore, in this example, it is possible to utilize one frequency channel whose bandwidth is 160 MHz and two frequency channels whose bandwidths are 20 MHz.

Further, in an example indicated with an arrow Q15, from the example indicated with the arrow Q11, further, some frequency channels which are adjacent to each other are bundled and utilized as a mix of a plurality of frequency channels whose bandwidths are different from each other.

That is, in this example, it is possible to utilize four frequency channels whose bandwidths are 20 MHz, one frequency channel whose bandwidth is 40 MHz, and one frequency channel whose bandwidth is 80 MHz.

In this manner, at the wireless communication apparatus, it is possible to divide a predetermined frequency band into a plurality of bands with an arbitrary bandwidth and utilize each band as a frequency channel for transmitting and receiving a signal.

Configuration Example of Wireless Communication Apparatus

A configuration of an apparatus which constitutes the BSS illustrated in FIG. 1 will be described next.

Figure 3:
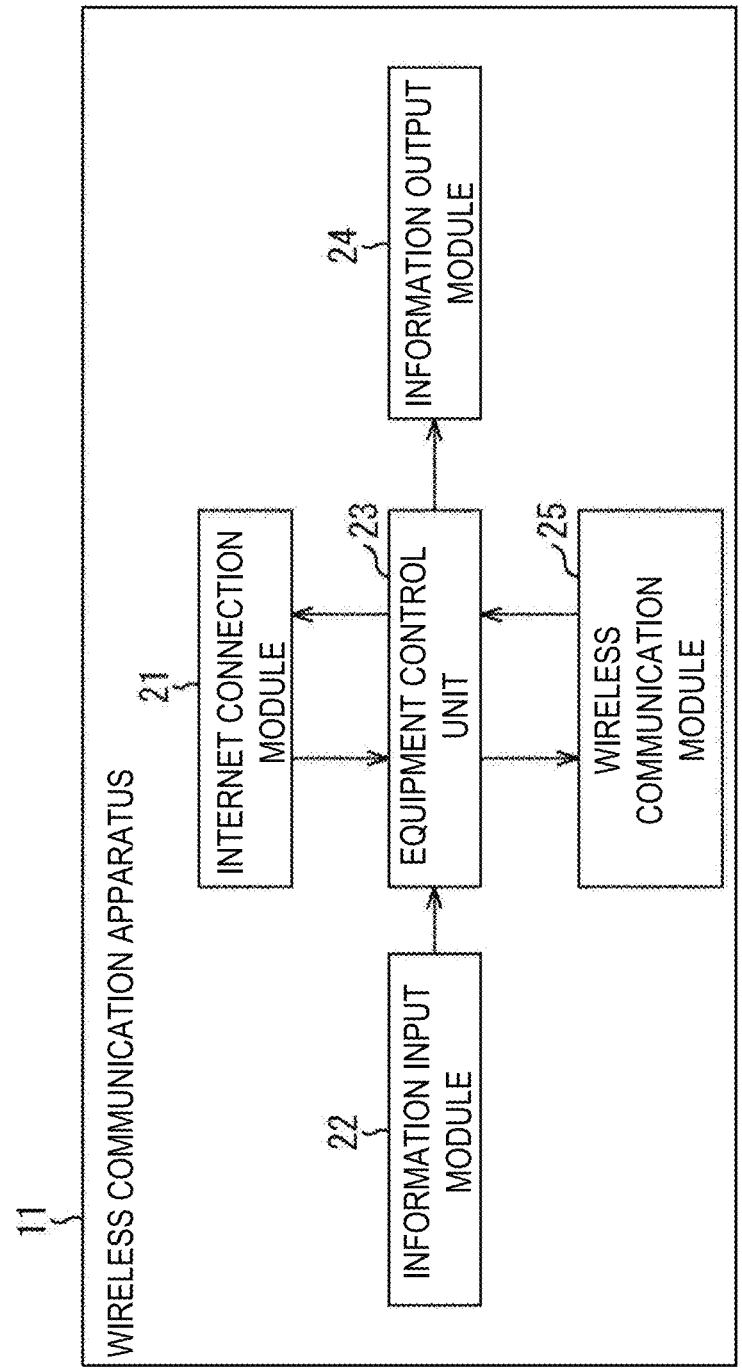
FIG. 3 is a diagram illustrating a configuration example of a wireless communication apparatus.

FIG. 3 is a diagram illustrating a configuration example of a wireless communication apparatus to which the present technology is applied.

A wireless communication apparatus 11 illustrated in FIG. 3 corresponds to, for example, the wireless communication apparatus STA0, the wireless communication apparatus STA1, or an apparatus such as the access point AP1, which constitute the BSS1 illustrated in FIG. 1.

Note that, here, description will be provided assuming that the wireless communication apparatus 11 is configured to be able to operate as either an access point such as the access point AP1 or a communication device such as the wireless communication apparatus STA0, which constitute the BSS, that is, a wireless LAN system. However, the wireless communication apparatus 11 may have a configuration in which a portion unnecessary for each operation is omitted as appropriate.

The wireless communication apparatus 11 includes an internet connection module 21, an information input module 22, an equipment control unit 23, an information output module 24, and a wireless communication module 25.

The internet connection module 21 functions as an adapter which is connected to the Internet in a wired manner in a case where, for example, the wireless communication apparatus 11 operates as the access point. That is, the internet connection module 21 supplies data received via the Internet to the equipment control unit 23 or transmits data supplied from the equipment control unit 23 to a communication partner via the Internet.

In a case where operation desired by a user is input by, for example, a button, or the like, being operated by the user, the information input module 22 acquires a signal in accordance with the operation of the user and supplies the signal to the equipment control unit 23. For example, in a case where various kinds of buttons and switches, a touch panel, a mouse, a keyboard, or the like, is operated by the user, or in a case where the user performs input operation to a microphone, or the like, through speech, or the like, the information input module 22 determines the operation input and acquires a signal supplied in accordance with the operation.

The equipment control unit 23 controls operation of the whole wireless communication apparatus 11 in accordance with a signal, or the like, supplied from the information input module 22. That is, the equipment control unit 23 includes blocks, and the like, which realize functions corresponding to a central processing unit (CPU) which manages control of the operation of the wireless communication apparatus 11 in an integrated manner and executes arithmetic processing, and an operating system (OS).

For example, the equipment control unit 23 supplies predetermined data to the wireless communication module 25 and causes the data to be transmitted to a communication partner through wireless communication, or acquires data received from the communication partner from the wireless communication module 25. Further, the equipment control unit 23 supplies information to the information output module 24 and causes the information to be displayed.

The information output module 24 includes, for example, a display, a speaker, or the like, and outputs information supplied from the equipment control unit 23 to the user. For example, the information output module 24 presents desired information to the user by causing the information supplied from the equipment control unit 23 to be displayed at a display of the own apparatus.

The wireless communication module 25 operates as a communication module for the wireless communication apparatus 11 to actually perform wireless communication operation. That is, the wireless communication module 25 transmits data supplied from the equipment control unit 23 in a frame of a predetermined format through wireless communication, and receives a signal transmitted through wireless communication and supplies data extracted from the received signal to the equipment control unit 23.

Configuration Example of Wireless Communication Module

Figure 4:
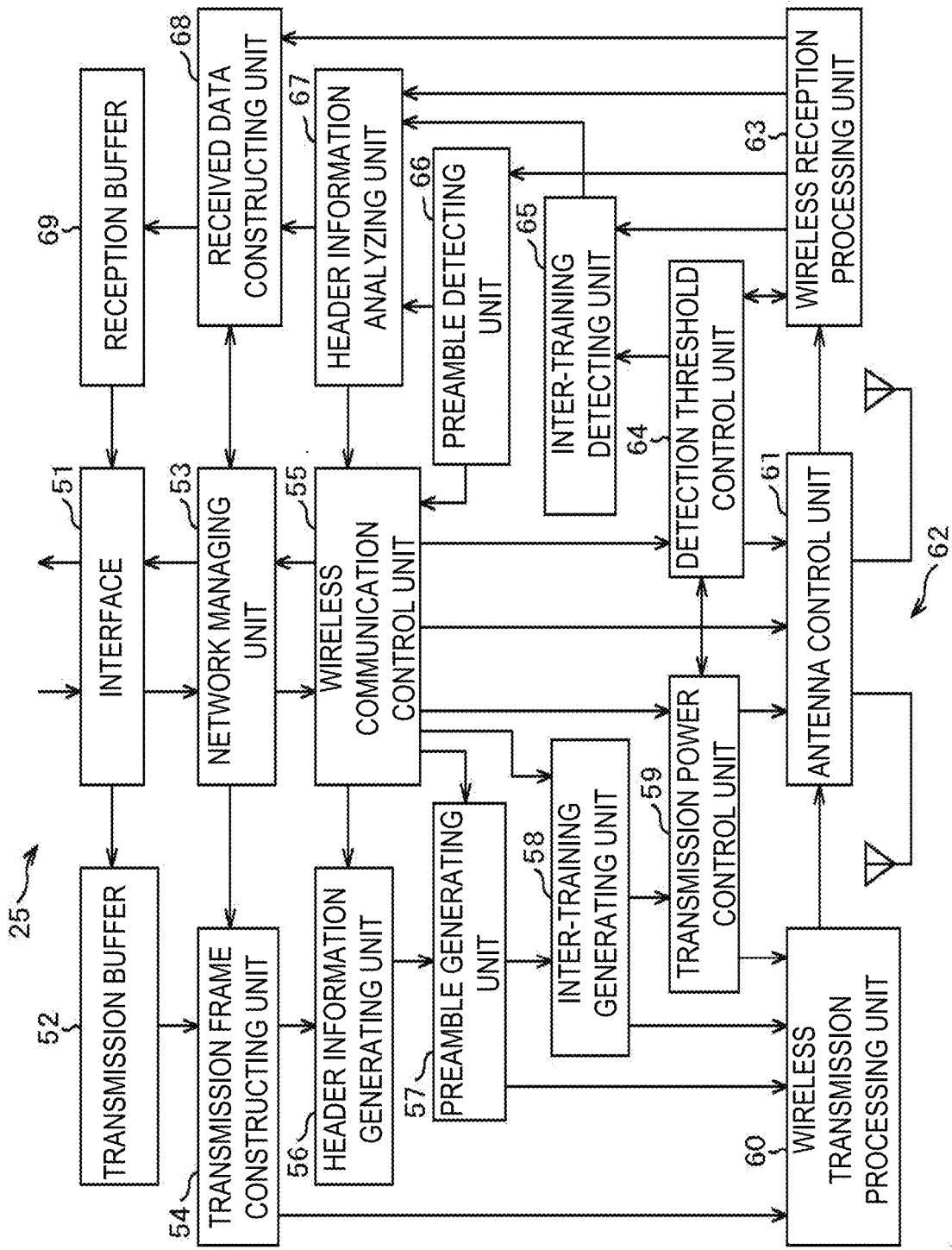
FIG. 4 is a diagram illustrating a configuration example of a wireless communication module.

Further, the wireless communication module 25 of the wireless communication apparatus 11 is configured as illustrated in, for example, FIG. 4.

The wireless communication module 25 illustrated in FIG. 4 includes an interface 51, a transmission buffer 52, a network managing unit 53, a transmission frame constructing unit 54, a wireless communication control unit 55, a header information generating unit 56, a preamble generating unit 57, an inter-training generating unit 58, a transmission power control unit 59, a wireless transmission processing unit 60, an antenna control unit 61, an antenna 62, a wireless reception processing unit 63, a detection threshold control unit 64, an inter-training detecting unit 65, a preamble detecting unit 66, a header information analyzing unit 67, a received data constructing unit 68, and a reception buffer 69.

The interface 51 is connected to other modules which constitute the wireless communication apparatus 11 such as, for example, the equipment control unit 23, supplies data supplied from other modules to the transmission buffer 52 and supplies data held at the reception buffer 69 to other modules. Further, the interface 51 supplies information supplied from other modules such as the equipment control unit 23 to the network managing unit 53 and supplies information supplied from the network managing unit 53 to other modules such as the equipment control unit 23.

The transmission buffer 52 holds data supplied from the interface 51 and supplies the held data to the transmission frame constructing unit 54.

For example, the data held at the transmission buffer 52 is data stored in a media access control (MAC) layer protocol data unit (MAC protocol data unit (MPDU)), to be transmitted in a wireless manner.

The network managing unit 53 manages a network which overlaps with the own network between the own apparatus and peripheral wireless communication apparatuses. That is, the network managing unit 53 supplies information supplied from the interface 51 and the received data constructing unit 68 to the wireless communication control unit 55. Further, the network managing unit 53 instructs the transmission frame constructing unit 54 to construct a frame including a predetermined number of MPDUs, or instructs the received data constructing unit 68 to construct data in a predetermined unit.

The transmission frame constructing unit 54 constructs a wireless communication frame in a predetermined aggregation unit for wireless communication by storing data held at the transmission buffer 52 in the MPDU in accordance with the instruction of the network managing unit 53 or coupling a plurality of MPDUs.

The transmission frame constructing unit 54 supplies the constructed wireless communication frame to the wireless transmission processing unit 60 as a transmission frame and supplies necessary information regarding the transmission frame to the header information generating unit 56.

Note that, in the following description, the wireless communication frame to be transmitted by the wireless communication apparatus 11 will be also particularly referred to as a transmission frame, and data stored in the MPDU of the transmission frame will be also referred to as transmission data. Further, the wireless communication frame to be received by the wireless communication apparatus 11 will be also particularly referred to as a received frame, and data stored in the MPDU of the received frame will be also referred to as received data.

The wireless communication control unit 55 performs access communication control on a wireless transmission path in accordance with predetermined communication protocol.

That is, the wireless communication control unit 55 controls each unit of the wireless communication module 25 on the basis of information, or the like, supplied from the network managing unit 53, the preamble detecting unit 66, the header information analyzing unit 67, or the like, and controls transmission and reception through wireless communication.

For example, the wireless communication control unit 55 supplies necessary information to the header information generating unit 56, the preamble generating unit 57, the inter-training generating unit 58, the transmission power control unit 59, the antenna control unit 61, and the detection threshold control unit 64, and controls various kinds of operation regarding wireless communication and supplies information regarding the network obtained from the received signal, or the like, to the network managing unit 53.

The header information generating unit 56 generates various kinds of information such as header information stored in a preamble, that is, a preamble signal on the basis of the information supplied from the transmission frame constructing unit 54 and the wireless communication control unit 55, and supplies the information to the preamble generating unit 57. That is, the header information generating unit 56 generates overhead information to be added to a head portion of the transmission frame.

The preamble generating unit 57 generates a preamble on the basis of the information supplied from the header information generating unit 56 and the wireless communication control unit 55, and supplies the preamble to the wireless transmission processing unit 60 and supplies at least part of the information included in the preamble to the inter-training generating unit 58. For example, the preamble is generated for each of a plurality of frequency channels.

The inter-training generating unit 58 generates an inter-training signal to be inserted into a middle of a signal of a frequency channel which is set as a management channel of the transmission frame on the basis of the information supplied from the preamble generating unit 57 and the wireless communication control unit 55 and supplies the inter-training signal to the wireless transmission processing unit 60.

By this means, the inter-training signal is inserted into a middle of the signal of the management channel. In this inter-training signal, various kinds of parameters of a training sequence included in the preamble, that is, information of a training field, the BSS Color information, or the like, are included. Note that the management channel is a frequency channel in which transmission of the inter-training signal is performed.

Further, the inter-training generating unit 58 supplies information included in the generated inter-training signal to the transmission power control unit 59 as appropriate.

The transmission power control unit 59 adjusts (controls) transmission power of the transmission frame to be transmitted to other apparatuses which perform wireless communication with the wireless communication apparatus 11 by controlling the wireless transmission processing unit 60 and the antenna control unit 61 in accordance with an instruction from the wireless communication control unit 55. That is, the transmission power control unit 59 controls operation at the wireless transmission processing unit 60 and the antenna control unit 61 so that the transmission frame is transmitted at predetermined transmission power.

The wireless transmission processing unit 60 sets a final transmission frame by adding the preamble supplied from the preamble generating unit 57 for the transmission frame (MPDU) supplied from the transmission frame constructing unit 54 and the inter-training signal supplied from the inter-training generating unit 58 to appropriate positions.

The wireless transmission processing unit 60 converts the obtained transmission frame into a predetermined baseband signal, performs modulation processing and signal processing on the basis of the baseband signal and supplies a transmission signal obtained as a result of the processing to the antenna control unit 61. That is, the wireless transmission processing unit 60 transmits a transmission signal (transmission frame) via the antenna control unit 61 and the antenna 62.

The antenna control unit 61 causes the transmission signal supplied from the wireless transmission processing unit 60 to be output (transmitted) from the antenna 62 in accordance with control by the transmission power control unit 59. Further, the antenna control unit 61 supplies the received signal received by the antenna 62 to the wireless reception processing unit 63.

The antenna 62 includes a plurality of elements, transmits the transmission signal supplied from the antenna control unit 61 in a wireless manner, receives the received signal which has been transmitted, and supplies the received signal to the antenna control unit 61.

The wireless reception processing unit 63 receives the received signal which is transmitted in a predetermined format in a wireless manner as a received frame via the antenna 62 and the antenna control unit 61 by comparing a detection threshold supplied from the detection threshold control unit 64 and received power of the received signal supplied from the antenna control unit 61. The wireless reception processing unit 63 supplies the received frame to the inter-training detecting unit 65, the preamble detecting unit 66, the header information analyzing unit 67, and the received data constructing unit 68.

The detection threshold control unit 64 determines the detection threshold to be used at the wireless reception processing unit 63 while providing and accepting necessary information to and from the wireless communication control unit 55 and the transmission power control unit 59, and supplies the detection threshold to the wireless reception processing unit 63. This detection threshold is used to detect the preamble and the inter-training signal included in the received signal.

The inter-training detecting unit 65 detects the inter-training signal inserted into a middle of a frame of the received signal (received frame) received at the wireless reception processing unit 63 for each of a plurality of frequency channels, and supplies the detection result to the header information analyzing unit 67.

The preamble detecting unit 66 detects the preamble added to the head of the received frame received at the wireless reception processing unit 63 for each of a plurality of frequency channels and supplies the detection result to the wireless communication control unit 55 and the header information analyzing unit 67.

The header information analyzing unit 67 extracts information such as the overhead information of the received frame on the basis of the detection results supplied from the inter-training detecting unit 65 and the preamble detecting unit 66 and analyzes description content (description) of the information. Further, the header information analyzing unit 67 supplies the extracted information, that is, information read out from the preamble and the inter-training signal to the wireless communication control unit 55 and the received data constructing unit 68.

The received data constructing unit 68 constructs the received signal received at the wireless reception processing unit 63, that is, data included in the aggregated received frame as received data in a predetermined unit on the basis of the information supplied from the header information analyzing unit 67. The received data constructing unit 68 supplies the constructed received data to the network managing unit 53 and the reception buffer 69.

The reception buffer 69 holds the received data supplied from the received data constructing unit 68 and supplies the held received data to the interface 51. The data held at the reception buffer 69 is received data extracted from a MAC layer protocol data unit (MPDU) of the received frame.

Frame Format Example

Here, a format of a signal provided and accepted between the respective wireless communication apparatuses will be described.

Figure 5:
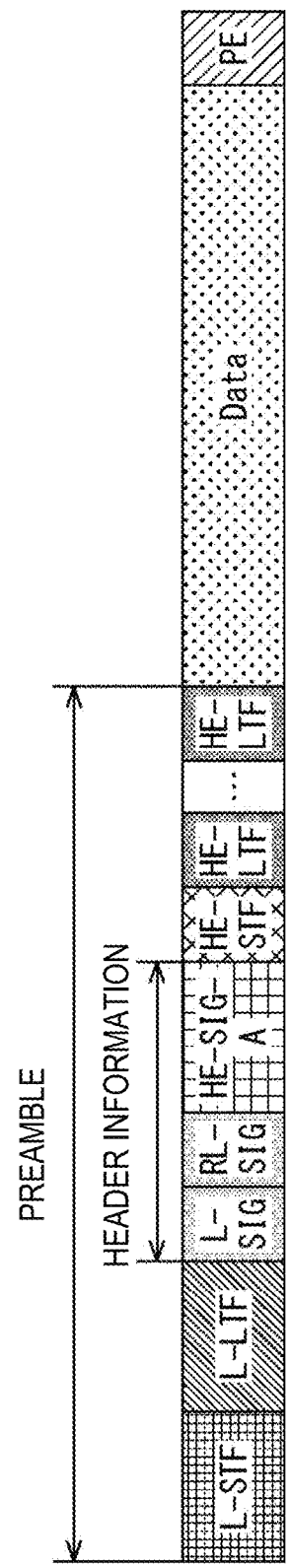
FIG. 5 is a diagram illustrating a typical frame format.

For example, in a case where frame aggregation is not performed, typically, a transmission frame in a frame format illustrated in FIG. 5 is transmitted and received between the wireless communication apparatuses.

In the example illustrated in FIG. 5, a preamble is arranged at the head of data corresponding to one frame of the transmission frame, and transmission data is arranged subsequent to the preamble.

That is, an L-STF, an L-LTF, an L-SIG, an RL-SIG, an HE-SIG-A, an HE-STF, and a predetermined number of HE-LTFs are sequentially arranged in the preamble.

These L-STF, L-LTF, L-SIG, RL-SIG, HE-SIG-A, HE-STF, and HE-LTFs which are overhead information are added to a head of the transmission frame as a predetermined preamble signal, and transmitted. Then, the reception side recognizes that the transmission frame is transmitted by detecting existence of the preamble.

The L-STF is called a short training field in related art (legacy short training field), is utilized as a criterion for detection of start of the transmission frame and time synchronization processing, and is also utilized for estimation of a frequency error and automatic gain control (AGC). This L-STF has a configuration where a predetermined sequence is repeated, and thus, the wireless communication apparatus on the reception side can detect a start position of the transmission frame by detecting correlation of this sequence.

The L-LTF is called a long training field in related art (legacy long training field), and the L-LTF has a configuration where a predetermined sequence is repeated. The L-LTF is utilized for performing channel estimation, estimation of a signal/noise (S/N), and time and frequency synchronization.

The L-SIG is called a signal (legacy signal) field in related art, and is signaling information having a configuration where rate information and length information of a data portion are described in an orthogonal frequency division multiplexing (OFDM) symbol at a head.

The RL-SIG is information (signaling information) set for detecting that this transmission frame is not a frame using schemes of previous generations, but an HE-PPDU.

This RL-SIG and the L-SIG have completely the same information, and, in the transmission frame, as a result of the L-SIG and the RL-SIG being continuously arranged, the L-SIG is repeatedly arranged.

The wireless communication apparatus on the reception side can specify that the transmission frame is a transmission frame in a format of a predetermined generation, that is, the transmission frame in a frame format illustrating in FIG. 5 by detecting the L-SIG and the RL-SIG which are continuously arranged.

The HE-SIG-A is information (signaling information) in which information for enabling application of a spatial multiplexing technology is stored as an A filed of a signal in a high-density system.

While a configuration is employed where predetermined communication is performed in accordance with parameters included in this HE-SIG-A, and parameters relating to the BSS Color information and Spatial Reuse are described in the HE-SIG-A, various parameters are included other than these as necessary.

A portion formed with the L-SIG, the RL-SIG, and the HE-SIG-A in the preamble is set as the header information.

Further, the HE-STF is a short training field (high efficiency short training field) in a high-density system, and is utilized for synchronization processing and adjustment of physical layer parameters which are required for realizing higher density.

The HE-LTF is a long training field (high efficiency long training field) in a high-density system.

This HE-LTF has a configuration where trainings of the number corresponding to the number of spatial multiplexed streams are stored in a case where transmission is performed using spatial multiplexed streams in multiple input multiple output (MIMO). That is, a predetermined number of the HE-LTFs are arranged after the HE-STF.

A portion from the L-STF to the HE-LTF described above is a preamble arranged at the head of the transmission frame. The wireless communication apparatus on the reception side can recognize that the transmission frame is transmitted by detecting such a preamble portion.

Further, Data subsequent to the preamble indicates transmission data, and a packet extintion (PE) is arranged as necessary in a tail end of the transmission frame, subsequent to the transmission data.

Note that the long training field (LTF) such as the L-LTF and the HE-LTF may be configured with a training sequence portion and a guard interval portion. Further, the long training field may be configured such that one guard interval is included in two OFDM symbols or may be configured such that two guard intervals are included in two OFDM symbols.

Further, the L-SIG illustrated in FIG. 5 is configured as illustrated in, for example, FIG. 6.

In the example illustrated in FIG. 6, rate information indicated by characters "RATE", length information indicated by characters "LENGTH", a parity bit indicated by a character "P", tail bit information indicated by characters "Tail", and the like, are included in the L-SIG.

The rate information is information indicating a rate (bit rate) of transmission data indicated by characters "Data" illustrated in FIG. 5, and the length information is information indicating a length of the transmission data indicated by the characters "Data" illustrated in FIG. 5.

Further, the HE-SIG-A illustrated in FIG. 5 is configured as illustrated in, for example, FIG. 7

In the example illustrated in FIG. 7, in the HE-SIG-A, as typical parameters relating to the present technology, uplink/downlink identifier information indicated by characters "UL/DL", MCS parameter information indicated by characters "NCS", BSS Color information indicated by characters "BSS Color", parameter information regarding the advanced spatial reuse technology indicated by characters "Spatial Reuse", transmission frame bandwidth information indicated by characters "Bandwidth", parameter information of sizes of the guard interval and the training field indicated by characters "GI±TF Size", spatial multiplexed stream number information indicated by characters "Nsts", transmission opportunity duration information indicated by characters "TROP Duration", an error-detecting code (cyclic redundancy check (CRC)) indicated by characters "CRC", tail bit information indicated by characters "Tail", and the like, are included.

For example, the MCS parameter is information indicating a modulation scheme and a coding scheme of the transmission data (transmission frame), and the BSS Color information is information indicating a BSS (wireless network) to which an apparatus of a transmission source of the transmission data belongs.

Frame Configuration Example Upon Frame Aggregation

Figure 8:
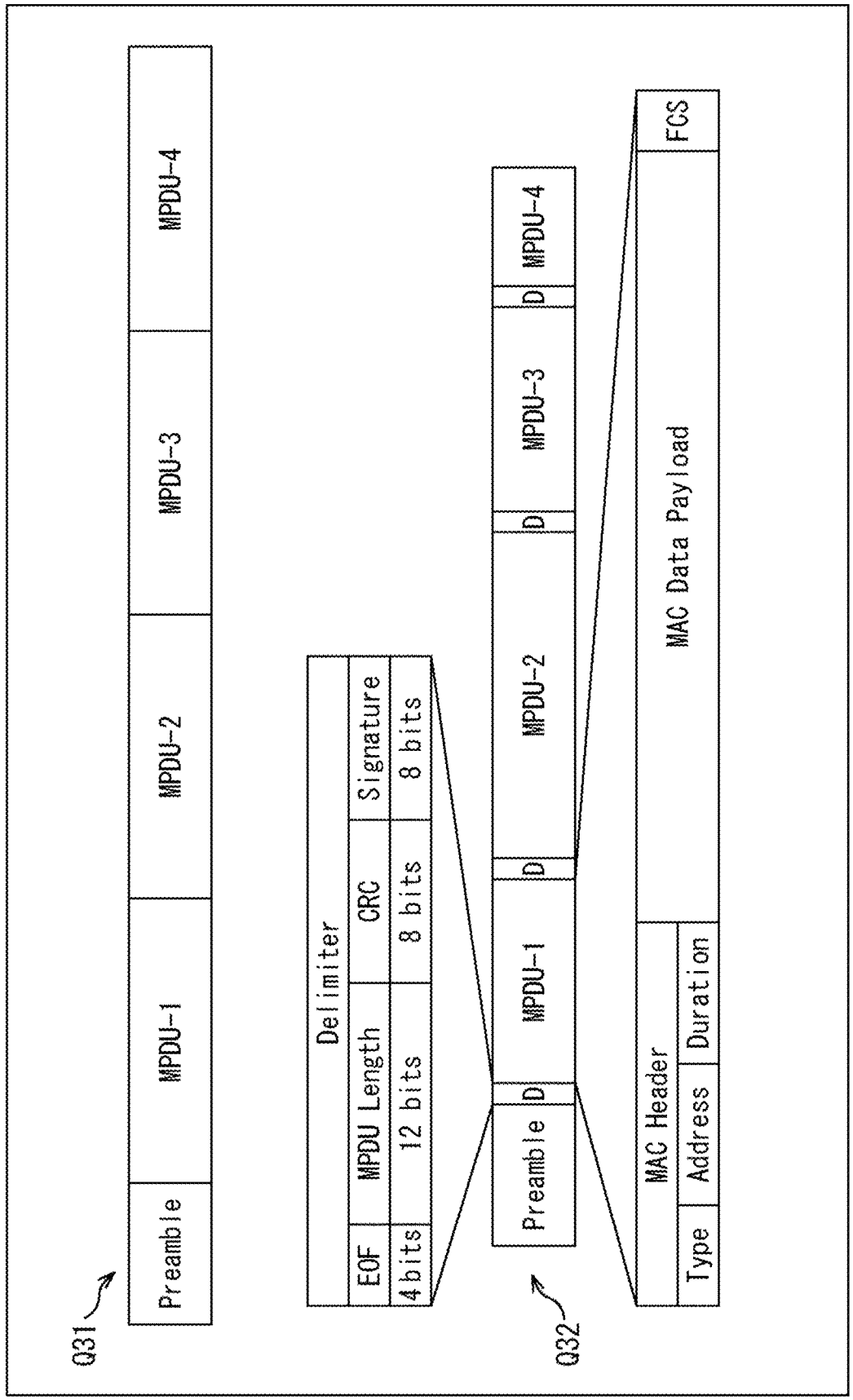
FIG. 8 is a diagram illustrating a configuration example of a transmission frame subjected to frame aggregation.

Further, in a case where frame aggregation is performed, a frame configuration of a typical transmission frame is as illustrated in FIG. 8.

FIG. 8 illustrates an example where four MAC layer protocol data units (MPDUs) are aggregated (coupled) as one transmission frame.

For example, in a case where each of the four MPDUs has a length determined in advance, that is, in a case where a length of the MPDU is a fixed length, the transmission frame is configured as indicated with an arrow Q31.

In this example, a preamble indicated by characters "Preamble" is arranged at the head of the transmission frame, and the aggregated MPDUs indicated by characters "MPDU-1" to "MPDU-4" are arranged after the preamble.

In other words, the transmission frame has a configuration where a preamble is added to a head of a portion including a plurality of MPDUs.

This preamble includes a predetermined legacy training field, PHY header information, and a training field for a predetermined spatial multiplexed stream, and four MPDUs are synthesized with this preamble to make one transmission frame.

In contrast, in a case where the length of the MPDU is a variable length, the transmission frame is configured as indicated with an arrow Q32.

In this example, four MPDUs indicated by characters "MPDU-1" to "MPDU-4" are arranged subsequent to the preamble at the head of the aggregated transmission frame, and delimiter information indicated by a character "D" is arranged immediately before each of these MPDUs. Further, the preamble in this example has the same configuration as the configuration in a case of the example indicated by the arrow Q31.

The delimiter information arranged immediately before each MPDU includes MPDU length information indicated by characters "MPDU Length", and the CRC, and the MPDU length information indicates an information length, that is, a length of the MPDU arranged immediately after the delimiter information.

Further, in each MPDU, MAC header information indicated by characters "MAC Header" is arranged at a head portion of the MPDU. In this MAC header information, address information indicated by characters "Address", and Duration information indicated by the characters "Duration" are stored.

Here, the address information is information indicating a destination of the MPDU, that is, an address identifying an apparatus of a transmission destination (recipient) of the transmission frame, and the Duration information is information indicating a duration of the MPDU. That is, because communication (transmission and reception) of the MPDU is performed only for a duration indicated by this Duration information, the Duration information can be said as information indicating a transmission period of the MPDU.

In the MPDU, a payload indicated by characters "MAC Data Payload", that is, transmission data stored in the MPDU is arranged subsequent to the MAC header information. This payload has a variable length.

In the MPDU, a frame check sequence (FCS) indicated by characters "FCS" is arranged after the payload, that is, at a tail end of the MPDU. With this frame check sequence, the reception side of the transmission frame can perform error detection.

As described above, it is possible to make a transmission frame (burst) by bundling and aggregating a plurality of MPDUs in which transmission data having a variable length is stored and transmit the obtained transmission frame.

Further, in a wireless communication system, it is possible to divide a predetermined frequency band into a plurality of bands as described above, and transmit a transmission frame using these bands as one frequency channel.

Figure 9:
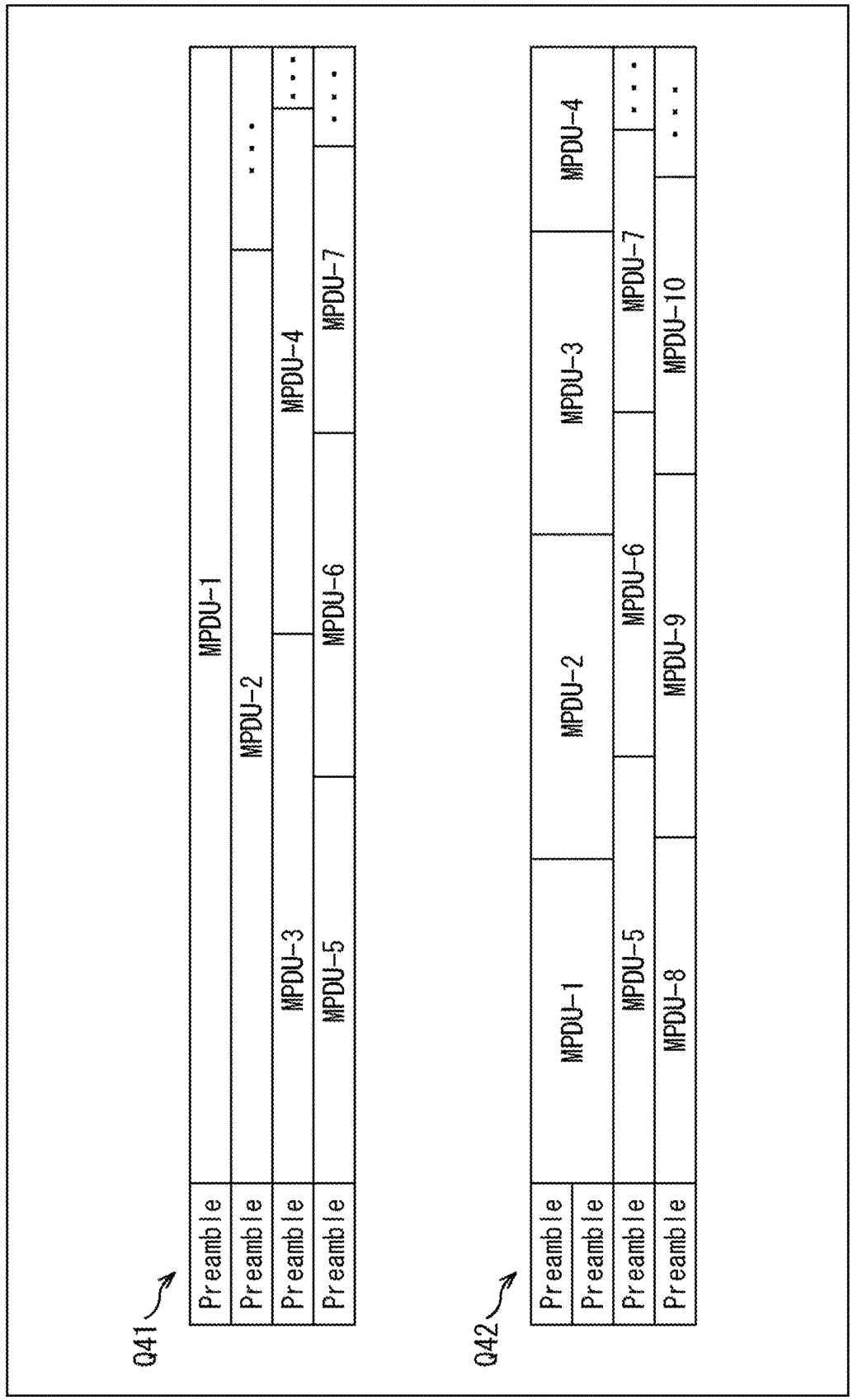
FIG. 9 is a diagram illustrating a configuration example of a typical transmission frame in a case where an MPDU is transmitted by utilizing a plurality of frequency channels.

FIG. 9 is a diagram illustrating a configuration example of a typical transmission frame in a case where a plurality of MPDUs, that is, MPDU data is transmitted by utilizing a plurality of frequency channels.

In the example illustrated in FIG. 9, some of the plurality of MPDUs (hereinafter, also simply referred to as MPDU-1 to MPDU-10) indicated by characters "MPDU-1" to "MPDU-10" are mapped on respective frequency channels, and these MPDUs are aggregated and transmitted.

That is, in an example indicated with an arrow Q41, transmission data, that is, MPDU-1 to MPDU-7 are transmitted by utilizing four frequency channels.

Specifically, MPDU-1 is transmitted over the entire duration of the transmission frame by utilizing a first frequency channel. A portion formed with this MPDU-1 and a preamble indicated by characters "Preamble" becomes a signal of the first frequency channel in the transmission frame.

Further, MPDU-2 is transmitted in a period slightly shorter than the duration of the transmission frame by utilizing a second frequency channel. That is, in the second frequency channel, transmission of MPDU-2 is performed during a period from transmission start time of the transmission frame until time slightly earlier than time determined by the duration of the transmission frame.

In a similar manner, MPDU-3 and MPDU-4 are transmitted in a period slightly shorter than the duration of the transmission frame by utilizing a third frequency channel, and MPDU-5, MPDU-6, and MPDU-7 are transmitted in a period slightly shorter than the duration of the transmission frame by utilizing a fourth frequency channel.

Still further, as indicated with an arrow Q42, there can be a frame configuration where a plurality of frequency channels is aggregated (coupled), and transmission data is transmitted in frequency channels with different bandwidths.

In an example indicated with the arrow Q42, the first and the second frequency channels in the example indicated with the arrow Q41 are aggregated, and set as a new broadband frequency channel.

For example, if original bandwidths of the first and the second frequency channels before aggregation are 20 MHz, a bandwidth of the new aggregated frequency channel formed with the first and the second frequency channels is 40 MHz, and bandwidths of the third and the fourth frequency channels remain to be 20 MHz.

In this case, while the first and the second frequency channels are aggregated to be utilized as one frequency channel whose bandwidth is 40 MHz, a preamble indicated by the characters "Preamble" is added to the transmission frame for each frequency channel before aggregation.

In this example, in the aggregated frequency channel whose bandwidth is 40 MHz, subsequent to the preamble, MPDU-1 to MPDU-4 are transmitted over the duration of the transmission frame.

Further, MPDU-5 to MPDU-7 are transmitted in a period slightly shorter than the duration of the transmission frame by utilizing the third frequency channel whose bandwidth is 20 MHz. Still further, MPDU-8 to MPDU-10 are transmitted in a period slightly shorter than the duration of the transmission frame by utilizing the fourth frequency channel whose bandwidth is 20 MHz.

Transmission Frame Configuration Example in the Present Technology

By the way, as described above, in the transmission frame configuration illustrated in FIG. 9, the wireless communication apparatus which receives the transmission frame from a middle of the frame cannot recognize a duration of the transmission frame and attribute of the transmission frame, that is, whether the signal is a signal of the BSS or a signal of the OBSS, or the like.

Figure 10:
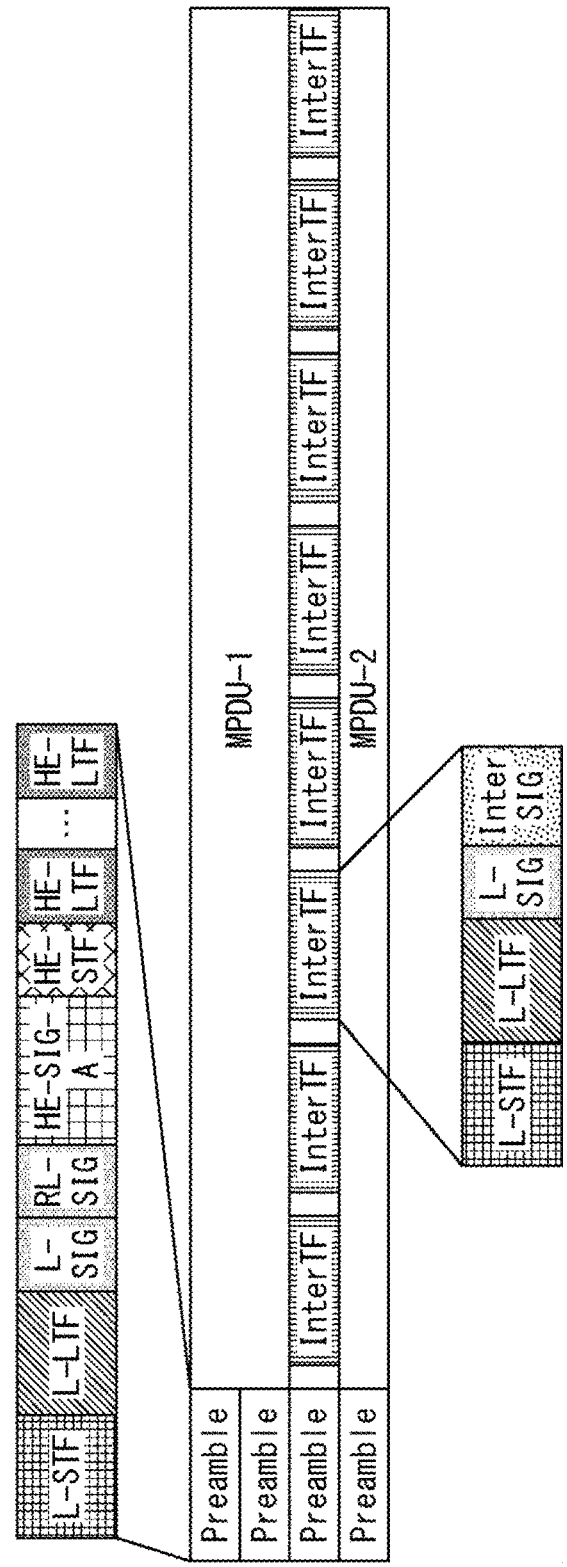
FIG. 10 is a diagram illustrating a configuration example of a transmission frame to which the present technology is applied.

Therefore, in the present technology, in a case where the transmission frame is transmitted by utilizing a plurality of frequency channels, for example, as illustrated in FIG. 10, the transmission frame configuration is employed in which the inter-training signal is repeatedly transmitted using the management channel.

In the example illustrated in FIG. 10, the characters "Preamble" indicate a preamble, and, in this example, the MPDUs indicated by the characters "MPDU-1" and "MPDU-2" (hereinafter, also simply referred to as MPDU-1 and MPDU-2) are transmitted using four frequency channels.

That is, in this example, transmission data, that is, MPDU-1 is transmitted using the first and the second frequency channels, and MPDU-2 is transmitted using the fourth frequency channel. Here, the first and the second frequency channels are aggregated to make one broadband frequency channel, and MPDU-1 is transmitted using the frequency channel.

Note that destinations of MPDU-1 and MPDU-2, that is, wireless communication apparatuses which become destinations of a signal (transmission frame) including MPDU-1 and a signal (transmission frame) including MPDU-2 may be the same or different from each other.

Further, in such a state, the inter-training signal indicated by characters "InterTF" is repeatedly transmitted over a duration of the MPDU using the third frequency channel.

Particularly, in this example, the third frequency channel is utilized as the management channel, and this third frequency channel is a channel of a narrow band whose bandwidth is narrower than that of the broadband channel to be used for transmission of MPDU-1. Further, the inter-training signal is repeatedly transmitted at predetermined time intervals in the third frequency channel.

Further, in the example illustrated in FIG. 10, a predetermined preamble (preamble signal) is added to a signal (transmission frame) to be transmitted in each frequency channel.

Here, in the preamble, to maintain compatibility with products in related art, the L-STF which is a legacy STF, the L-LTF which is a legacy LTF, the L-SIG which is a legacy SIGNAL, the RL-SIG which is repetition of the L-SIG, the HE-SIG-A which is an A field of a signal in a high-density system, the HE-STF which is an STF in a high-density system, and the HE-LTF which is an LTF in a high-density system are sequentially stored in line. Particularly, the HE-LTFs of the number corresponding to the number of signals to be synthesized in a spatial multiplexing manner are added.

A portion including the L-SIG, the RL-SIG, and the HE-SIG-A among the overhead information constituting the preamble is header information.

Further, as the inter-training signal, the L-STF, the L-LTF, the L-SIG, and the Inter SIG are sequentially arranged in line from the head. That is, a signal (information) including the L-STF, the L-LTF, the L-SIG, and the Inter-SIG is set as the inter-training signal.

Particularly, in this example, in the inter-training field (inter-training signal), to maintain compatibility with products in related art, a configuration is employed where the Inter-SIG which is inter-signal information is added to the L-STF which is a legacy STF, the L-LTF which is a legacy LTF, and the L-SIG which is a legacy SIGNAL. Here, the inter-signal information (Inter-SIG) is information including at least part of information among the information included in the header information. Further, the Inter-SIG may include information which is not included in the header information.

The wireless communication apparatus 11 knows that the L-SIG is always arranged after the L-STF and the L-LTF which are training signals, and the RL-SIG and the HE-SIG-A or the inter-signal information is arranged after the L-SIG.

Therefore, the wireless communication apparatus 11 can detect the preamble and the inter-training signal by detecting the L-STF and the L-LTF and can read out the header information, the inter-signal information, or the like, included in the preamble and the inter-training signal.

The transmission frame including one or a plurality of frequency channels, transmitted by the wireless communication apparatus 11 includes a preamble signal, transmission data (MPDU), and the inter-training signal. Further, in the inter-training signal, part of the header information, or the like, included in the preamble signal of the transmission frame is stored. Therefore, it can be said that the inter-training signal includes information regarding the transmission data within the same transmission frame.

Specifically, it is assumed, for example, that the inter-training signal, MPDU-1, and MPDU-2 are transmitted by the same wireless communication apparatus 11. In this event, for example, the L-SIG and the inter-signal information of the inter-training signal includes rate information and length information of MPDU-1 and MPDU-2, parameters to be applied to the spatial reuse technology, MCS parameters, a receiving sensitivity control level, or the like. That is, the L-SIG and the inter-signal information of the inter-training signal include part of the header information, or the like, within the preamble of the transmission frame including MPDU-1 and MPDU-2.

In this example, one frequency channel is set as the management channel, and in the management channel, the inter-training signal is intermittently and repeatedly transmitted. Specifically, after one inter-training signal is transmitted, after a section of no-signal, that is, a section in which no signal is transmitted is provided for the sake of expediency, the next inter-training signal is transmitted.

Among the wireless communication apparatuses, there is a wireless communication apparatus which determines that a preamble and an inter-training signal are detected on the basis of change of a received signal level when detecting the L-STF and the L-LTF after the section of no-signal. Therefore, as in the example illustrated in FIG. 10, by a section of no-signal being provided between the inter-training signals to be transmitted, such a wireless communication apparatus can also correctly detect the preamble and the inter-training signal.

Note that, in the management channel, the inter-training signal may be continuously transmitted without a section of no-signal being provided, or the inter-training signal may be transmitted at regular intervals or at irregular intervals by a section of no-signal being provided.

As described above, by the inter-training signal repeatedly including part of the header information being repeatedly transmitted in the management channel, that is, by the transmission frame continuously including a plurality of inter-training signals being transmitted, even a wireless communication apparatus which receives a middle of the transmission frame can obtain part of the header information, or the like.

By this means, because the wireless communication apparatus which receives the inter-training signal can recognize a usage situation of the wireless transmission path such as, for example, the duration of the transmission frame and attribute of the transmission frame, it is possible to perform communication more efficiently.

Further, in FIG. 10, an example has been described where aggregation is performed over four frequency channels, that is, an example where four frequency channels are utilized. However, there may be any number of frequency channels, and a plurality of arbitrary frequency channels may be aggregated to be utilized as one frequency channel. In this event, a bandwidth of the management channel is preferably equal to or narrower than bandwidths of frequency channels in which other transmission data (MPDU) is to be transmitted.

Figure 11:
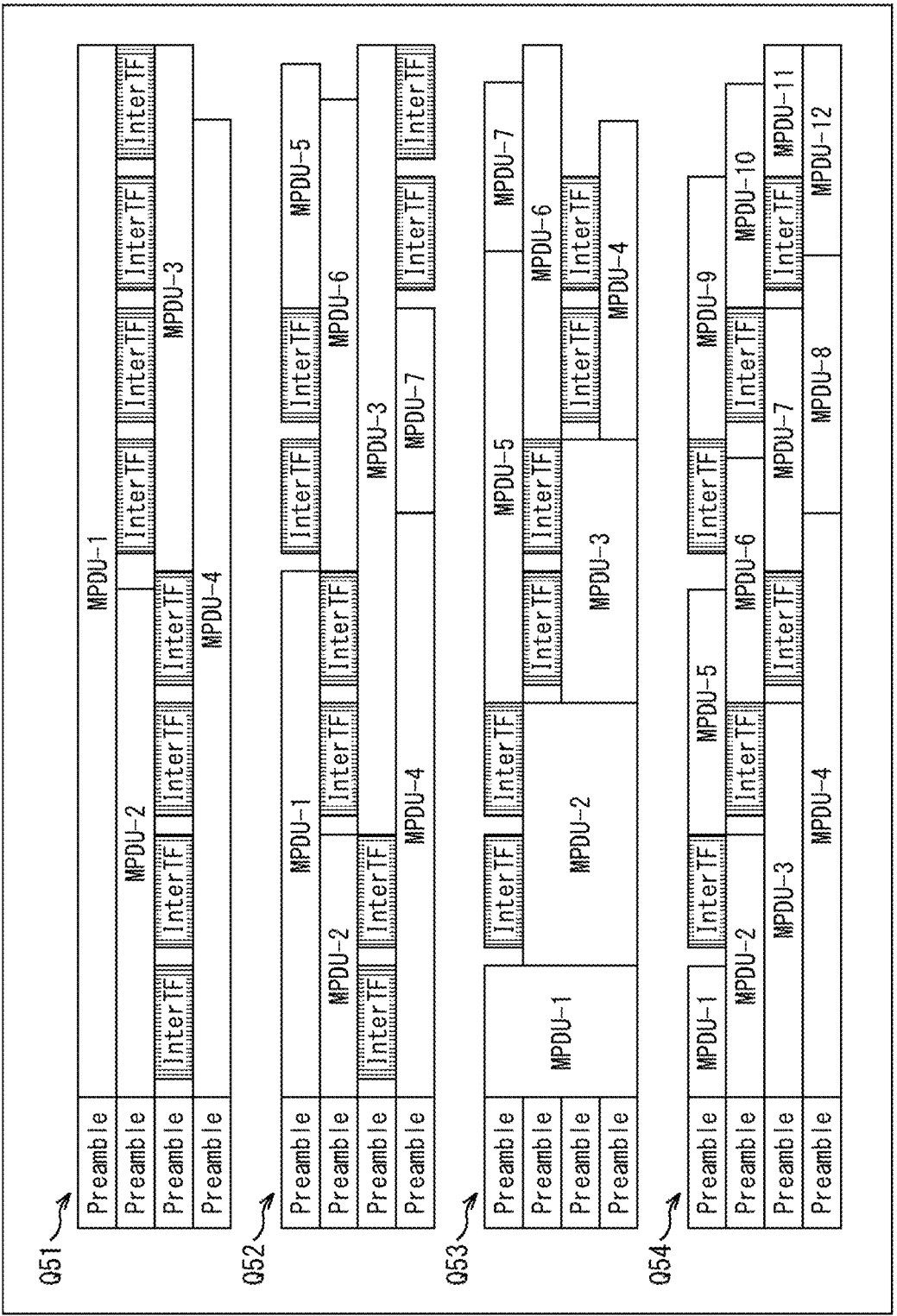
FIG. 11 is a diagram illustrating a configuration example of a transmission frame to which the present technology is applied.

Further, for example, as illustrated in FIG. 11, a frequency channel to be utilized as the management channel may be shifted (changed) over time.

Note that, in FIG. 11, the characters "Preamble" indicate the preamble, and characters "MPDU-1" to "MPDU-12" indicate the MPDUs. Further, characters "InterTF" indicate the inter-training signal. In the following description, the MPDUs indicated by the respective characters "MPDU-1" to "MPDU-12" will be also simply referred to as MPDU-1 to MPDU-12.

In the example illustrated in FIG. 11, the transmission frame including the MPDUs and the inter-training signal is transmitted using four frequency channels.

Specifically, in an example indicated with an arrow Q51, MPDU-1 is transmitted using a first frequency channel, and MPDU-4 is transmitted using a fourth frequency channel. Particularly, MPDU-1 is transmitted over the entire duration of the transmission frame in the first frequency channel.

Further, in such a state, in the second frequency channel, MPDU-2 is transmitted in a first half of the transmission frame, and the inter-training signal is intermittently and repeatedly transmitted in a last half of the transmission frame.

Still further, in the third frequency channel, the inter-training signal is intermittently and repeatedly transmitted in the first half of the transmission frame, and MPDU-3 is transmitted in the last half of the transmission frame.

Therefore, in this example, the third frequency channel is set as the management channel in the first half of the transmission frame, and the inter-training signal is repeatedly transmitted in the third frequency channel. In this event, in the second frequency channel which is not set as the management channel, MPDU-2 which is transmission data is transmitted.

Further, in the last half of the transmission frame, the management channel is switched (shifted) from the third frequency channel to the second frequency channel, and the inter-training signal is repeatedly transmitted in the second frequency channel. In this event, in the third frequency channel which is no longer the management channel, MPDU-3 is transmitted.

In a case where the frequency channel which is set as the management channel is shifted over time, the frequency channel which is set as the management channel at a certain timing has a section in which the inter-training signal is transmitted and a section in which the MPDU is transmitted. That is, the inter-training signal is transmitted at a timing before transmission or after transmission of the MPDU.

In this manner, by shifting the frequency channel (frequency band) which is set as the management channel, it is possible to notify more wireless communication apparatuses of a usage situation of the wireless transmission path.

It is, for example, assumed that there is a wireless communication apparatus which cannot receive a signal in the third frequency channel but can receive a signal in the second frequency channel.

In this case, such a wireless communication apparatus cannot receive the inter-training signal included in the third frequency channel which is set as the management channel in the first half of the transmission frame. However, at a timing at which the last half of the transmission frame is transmitted, because the wireless communication apparatus can receive a signal in the second frequency channel which is set as the management channel, that is, the inter-training signal, the wireless communication apparatus can recognize the usage situation of the wireless transmission path.

Further, in an example indicated with an arrow Q52, all the frequency channels in which the MPDU which is data is transmitted are utilized as the management channel, and the inter-training signal is distributed in a time direction and transmitted using these frequency channels.

That is, in this example, it is assumed that four frequency channels are sequentially utilized as the management channel.

Specifically, at a first timing, the third frequency channel is set as the management channel, and the inter-training signal is transmitted in the third frequency channel, and, at the next timing, the inter-training signal is transmitted in the second frequency channel.

Further, at the subsequent timing, the inter-training signal is transmitted in the first frequency channel, and, at the last timing, the inter-training signal is transmitted in the fourth frequency channel.

Therefore, in the first frequency channel, MPDU-1 is transmitted immediately after transmission of the transmission frame is started, and, thereafter, when the first frequency channel becomes the management channel, the inter-training signal is repeatedly transmitted, and further thereafter, when the first frequency channel is no longer the management channel, MPDU-5 is transmitted.

Further, in the second frequency channel, after MPDU-2 is transmitted, the second frequency channel is set as the management channel, and the inter-training signal is repeatedly transmitted, and thereafter, when the second frequency channel is no longer the management channel, MPDU-6 is transmitted. In the third frequency channel, the third frequency channel is set as the management channel immediately after transmission of the transmission frame is started, and the inter-training signal is transmitted, and thereafter, when the third frequency channel is no longer the management channel, MPDU-3 is transmitted.

Still further, in the fourth frequency channel, when MPDU-4 and MPDU-7 are sequentially transmitted, thereafter, the fourth frequency channel is set as the management channel, and the inter-training signal is repeatedly transmitted until a timing of completion of transmission of the transmission frame.

That is, in this example, from a timing of the head of the transmission frame until a timing of completion of transmission of the transmission frame, the respective frequency channels of the third frequency channel, the second frequency channel, the first frequency channel, and the fourth frequency channel are sequentially utilized as the management channel. Then, the inter-training signal is transmitted in these management channels.

Further, in an example indicated with an arrow Q53, while a plurality of frequency channels is utilized as the management channel, the MPDU is configured by utilizing a plurality of frequency channels in some sections. That is, a plurality of frequency channels is bundled and utilized as a broadband frequency channel. Further, the inter-training signal is transmitted in individual frequency channels between the MPDUs in the plurality of frequency channels.

Specifically, in this example, subsequent to a predetermined preamble, MPDU-1 is transmitted by utilizing four frequency channels of the first to the fourth frequency channels which are aggregated to be utilized as one broadband frequency channel. That is, MPDU-1 is transmitted using the first to the fourth frequency channels.

When MPDU-1 is transmitted, in a state where MPDU-2 is being transmitted using the second to the fourth frequency channels, the first frequency channel is utilized as the management channel, and the inter-training signal is repeatedly transmitted in the first frequency channel.

Further, thereafter, MPDU-5 is transmitted using the first frequency channel, MPDU-3 is transmitted using the third and the fourth frequency channels, and the inter-training signal is repeatedly transmitted using the second frequency channel as the management channel.

Further, at a timing at which transmission of MPDU-3 is completed, MPDU-5 is continuously transmitted in the first frequency channel, and, when transmission of MPDU-5 is completed, thereafter, MPDU-7 is transmitted in the first frequency channel.

Further, at a timing at which transmission of MPDU-3 is completed, MPDU-6 is transmitted in the second frequency channel, MPDU-4 is transmitted in the fourth frequency channel, and the inter-training signal is repeatedly transmitted using the third frequency channel as the management channel. Note that it is also possible to prevent the inter-training signal from being transmitted in some sections such as a section in a tail end portion of the transmission frame.

Also in the example indicated with the arrow Q53, the management channel is shifted sequentially from the first frequency channel to the second frequency channel and, then, the third frequency channel.

Further, as indicated with an arrow Q54, a plurality of sections of the transmission frame, which is different from each other may be utilized as the management channel in one frequency channel.

In this example, subsequent to the preamble, respective MPDU-1 to MPDU-4 are transmitted respectively in the first to the fourth frequency channels.

Further, when transmission of MPDU-1 is completed, the first frequency channel is set as the management channel, and the inter-training signal is transmitted in the first frequency channel.

Then, because transmission of MPDU-2 is completed at a timing at which transmission of this inter-training signal is completed, the second frequency channel is set as the management channel, and the inter-training signal is transmitted in the second frequency channel. In this event, transmission of MPDU-5 is started in the first frequency channel.

In addition, because transmission of MPDU-3 is completed at a timing at which transmission of the inter-training signal in the second frequency channel is completed, the third frequency channel is set as the management channel, and the inter-training signal is transmitted in the third frequency channel. In this event, transmission of MPDU-6 is started in the second frequency channel.

Further, because transmission of MPDU-5 is completed at a timing at which transmission of the inter-training signal in the third frequency channel is completed, the first frequency channel is set as the management channel, and the inter-training signal is transmitted in the first frequency channel. In this event, transmission of MPDU-7 is started in the third frequency channel, and, when transmission of MPDU-4 is completed during transmission of the inter-training signal in the first frequency channel, transmission of MPDU-8 is started in the fourth frequency channel.

Because transmission of MPDU-6 is completed at the time when transmission of the inter-training signal in the first frequency channel is completed, the second frequency channel is set as the management channel, and the inter-training signal is transmitted in the second frequency channel. In this event, transmission of MPDU-9 is started in the first frequency channel.

Further, because transmission of MPDU-7 is completed at a timing at which transmission of the inter-training signal in the second frequency channel is completed, the third frequency channel is set as the management channel, and the inter-training signal is transmitted in the third frequency channel. In this event, transmission of MPDU-10 is started in the second frequency channel.

Further, when transmission of MPDU-8 is completed in the fourth frequency channel, transmission of MPDU-12 is started subsequent to the transmission of MPDU-8, and, when transmission of the inter-training signal in the third frequency channel is completed, MPDU-11 is transmitted in the third frequency channel thereafter.

In this example, for the entire frequency band, the first to the third frequency channels are sequentially and repeatedly set as the management channel. That is, when the third frequency channel is set as the management channel, the first frequency channel is set as the management channel again thereafter.

Further, when, for example, attention is focused on the first frequency channel, a state where the first frequency channel is the management channel and a state where the first frequency channel is not the management channel are alternately repeated, such that the first frequency channel is set as the management channel after MPDU-1 is transmitted, and further, thereafter, the first frequency channel is no longer the management channel again, and MPDU-5 is transmitted. That is, the inter-training signal is transmitted in the first frequency channel at a timing before transmission data (MPDU) is transmitted and at a timing after the transmission data is transmitted.

As described above, there are various kinds of variation in a transmission method of the inter-training signal, that is, a selection method of the management channel. Any transmission pattern of the inter-training signal may be employed if a plurality of inter-training signals is transmitted at regular intervals or irregular intervals when viewed in a time direction.

That is, a plurality of inter-training signals is transmitted at regular intervals or at irregular intervals when viewed in a time direction, and, at each timing at which the inter-training signal is transmitted, it is only necessary that the inter-training signal is transmitted using at least one frequency channel among one or a plurality of frequency channels.

For example, when attention is focused on one wireless communication apparatus 11, at the wireless communication apparatus 11, the MPDU in which transmission data is stored is transmitted after the preamble signal is transmitted in at least one or more frequency channels among a plurality of frequency channels. Further, at the wireless communication apparatus 11, during transmission of the transmission data, that is, during a transmission period, one or a plurality of frequency channels among the above-described plurality of frequency channels is set as the management channel, and a plurality of inter-training signals is transmitted by utilizing the management channel after transmission of the preamble signal.

Note that, because the inter-training signal is repeatedly transmitted, a bandwidth of the management channel to be used for transmission of the inter-training signal may be equal to or less than the bandwidth of the frequency channel in which MPDU which is transmission data is transmitted.

Configuration Example of Inter-Signal Information

A configuration example of inter-signal information (Inter-SIG) constituting the inter-training signal, to which the present technology is applied, will be described next.

Figure 12:
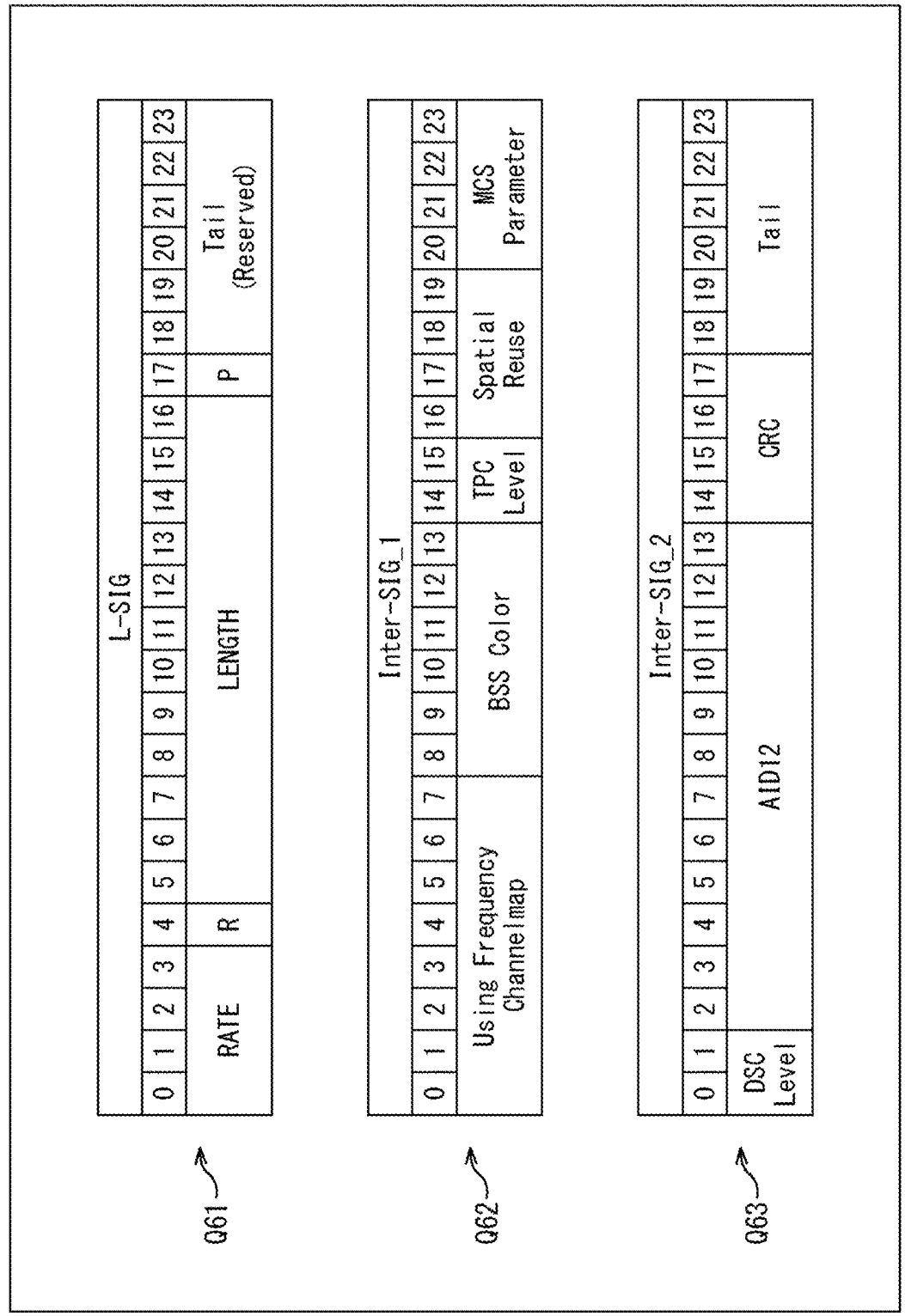
FIG. 12 is a diagram illustrating a configuration example of inter-signal information.

For example, the inter-signal information is configured as illustrated in FIG. 12.

In the example illustrated in FIG. 12, the inter-signal information includes a portion configured with the same signal as a signal of the signal information (L-SIG) in related art indicated with an arrow Q61, a portion of Inter-SIG 1 indicated with an arrow Q62, and a portion of Inter-SIG 2 indicated with an arrow Q63. Note that the configuration of the inter-signal information is not limited to the configuration illustrated in FIG. 12, and may be any configuration.

A portion of the signal information (L-SIG) indicated with the arrow Q61 may have the same configuration as bit arrangement in, for example, the legacy L-SIG in related art.

Here, bit arrangement of the portion of the signal information indicated with the arrow Q61 is the same as the bit arrangement of the legacy L-SIG.

That is, a portion of the signal information (L-SIG) indicated with the arrow Q61 includes rate information (Rate) indicating a rate of the transmission data, Reserved (R) which is a Reserved region, length information (Length) indicating Remaining Duration which is a remaining period of this transmission frame, and information such as parity (P).

Particularly, the length information is information regarding a transmission period of the transmission data, that is, a transmission period of a transmission frame including transmission data and the inter-training signal to be transmitted by one wireless communication apparatus. Therefore, it is possible to set network allocation vector (NAV) information which is a period during which transmission of an own signal is inhibited on the basis of this length information.

Further, a portion of Inter-SIG 1 indicated with the arrow Q62 includes channel map information indicated by characters "Using Frequency Channel Map", BSS Color information indicated by characters "BSS Color", a transmission power control level indicated by characters "TPC Level", parameters to be applied to a spatial reuse technology indicated by characters "Spatial Reuse", and information indicating a modulation scheme and a coding scheme of the transmission frame (coding and modulation scheme information), indicated by characters "MCS".

The channel map information is information regarding a frequency channel to be utilized for transmission of the transmission data (MPDU). More specifically, the channel map information is information indicating mapping of frequency channels to be utilized for a series of data transmission, that is, information indicating a usage situation of the wireless transmission path such as information indicating what kind of frequency channels exist and what kind of transmission data is transmitted in each frequency channel. Therefore, by referring to this channel map information, each wireless communication apparatus can recognize the usage situation of the wireless transmission path (frequency band) such as what kind of frequency channels exist and whether transmission data is transmitted in each frequency channel.

Further, the BSS Color information is information for identifying a BSS to which an apparatus which transmits the inter-training signal including this inter-signal information, that is, an apparatus of a transmission source of the signal belongs, and the transmission power control level (TPC Level) is transmission power information indicating transmission power of the transmission frame.

Note that, among the portion of the Inter-SIG 1 indicated with the arrow Q62, for example, the BSS Color information and parameters (Spatial Reuse) to be applied to the spatial reuse technology, information (MCS) indicating a modulation scheme and the coding scheme, and the like, are header information of the preamble, more particularly, information included in the HE-SIG-A.

Further, a portion of the Inter-SIG 2 indicated with the arrow Q63 includes a receiving sensitivity control level (DSC Level) which is receiving sensitivity information indicating receiving sensitivity of the transmission frame, information of part of an address indicating a wireless communication apparatus which is a transmission source or a recipient of the transmission frame (AID12), an error detection code (CRC) of the inter-signal information, a Tail bit indicating an end, and the like.

Note that information (parameters) described in the inter-signal information is not limited to the information illustrated in FIG. 12, and may be any other information. That is, further other information may be added to the information illustrated in FIG. 12, or part of the information may be deleted from the information illustrated in FIG. 12. Specifically, in addition to the information illustrated in, for example, FIG. 12, further, an identifier indicating a frame type (type) of the transmission frame such as a management frame for controlling a frame, or the like, in which the inter-training signal is transmitted and an action frame for exchanging parameters may be included in the inter-signal information.

(Improvement of Communication Efficiency by the Present Technology)

By the way, in a case where transmission of the inter-training signal is not performed as in the present technology, if a portion of the header information of the transmission frame cannot be correctly received, transmission efficiency degrades due to retransmission of the transmission frame.

Specifically, it is assumed, for example, that the access point AP1 illustrated in FIG. 1 transmits a transmission frame to the wireless communication apparatus STA0, and the access point AP2 illustrated in FIG. 1 transmits the transmission frame to the wireless communication apparatus STA2 at the same time.

Here, the transmission frames to be transmitted by the access point API and the access point AP2 are frames having a typical configuration into which the inter-training signal is not inserted.

Figure 13:
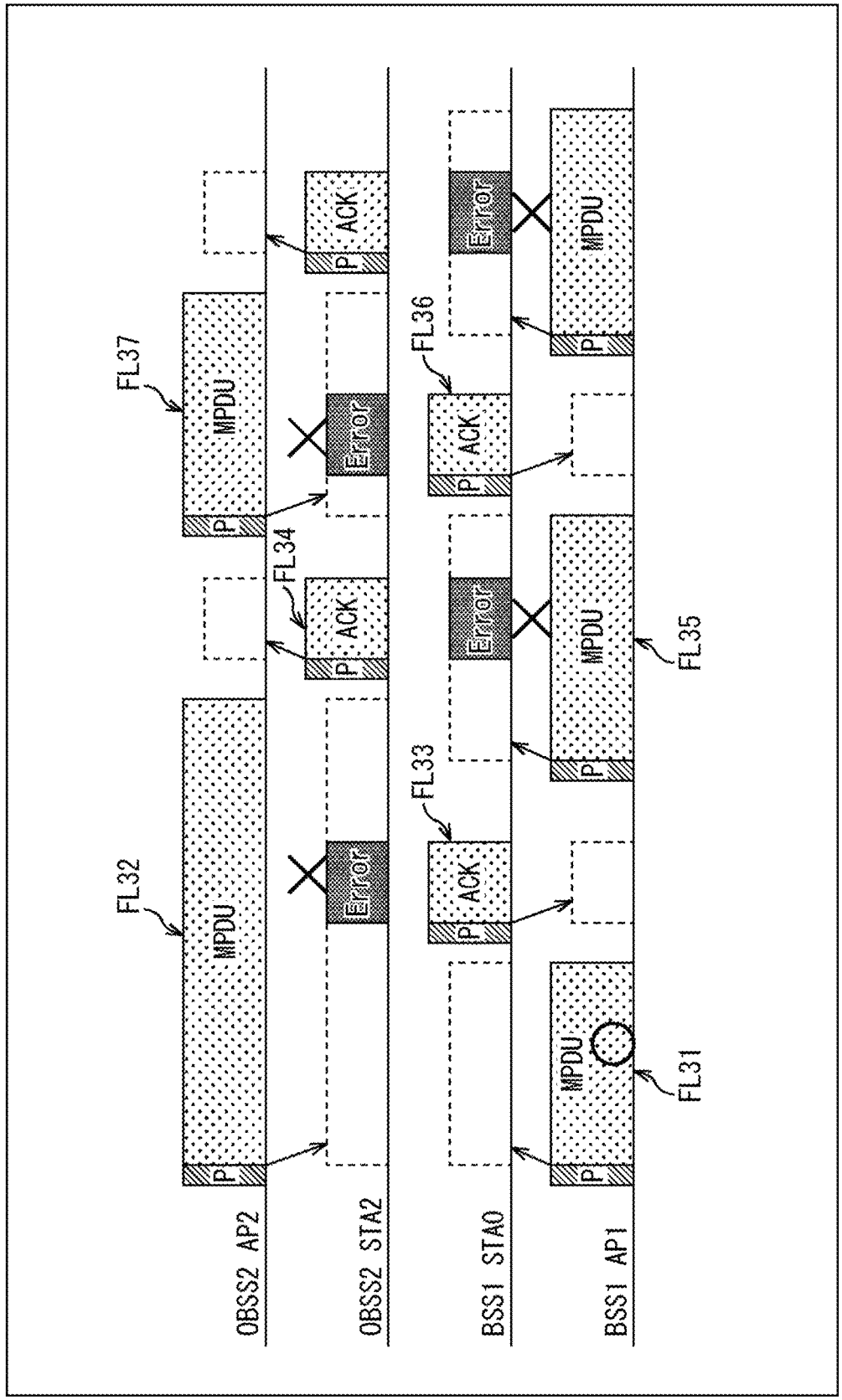
FIG. 13 is a diagram explaining communication using typical advanced spatial reuse.

In such a case, for example, as illustrated in FIG. 13, if the header information of the transmission frame cannot be correctly received, transmission efficiency (communication efficiency) degrades due to retransmission of the transmission frame.

In the example illustrated in FIG. 13, in the middle of transmission of a transmission frame FL31 addressed to the wireless communication apparatus STA0 by the access point AP1 of the own BSS1, the access point AP2 of the OBSS2 transmits a transmission frame FL32 addressed to the wireless communication apparatus STA2.

Here, because the wireless communication apparatus STA0 can correctly receive the transmission frame FL31, the wireless communication apparatus STA0 transmits an ACK frame FL33 indicating that the transmission frame FL31 can be received, to the access point AP1.

However, interference (collision) occurs by this ACK frame FL33, and the wireless communication apparatus STA2 cannot correctly receive the transmission frame FL32, which results in a state where a communication error occurs. The wireless communication apparatus STA2 transmits an ACK frame FL34 indicating only the MPDU of the transmission frame FL32, which can be correctly received, to the access point AP2.

Further, while a transmission frame FL35 addressed to the wireless communication apparatus STA0 is transmitted from the access point AP1 at a transmission timing of the ACK frame FL34, a communication error occurs at the wireless communication apparatus STA0 due to interference of this transmission frame FL35 and the ACK frame FL34. That is, at the wireless communication apparatus STA0, the transmission frame FL35 cannot be correctly received. The wireless communication apparatus STA0 transmits the ACK frame FL36 indicating only the MPDU of the transmission frame FL35, which can be correctly received, to the access point API.

Further, while the access point AP2 retransmits a transmission frame FL37 corresponding to the MPDU of the transmission frame FL32, which cannot be correctly received, in response to the ACK frame FL34, a communication error occurs at the wireless communication apparatus STA2 due to interference of this transmission frame FL37 and the ACK frame FL36. That is, at the wireless communication apparatus STA2, the transmission frame FL37 cannot be correctly received.

In this manner, in the example illustrated in FIG. 13, in the middle of communication from the access point AP1 of the BSS1 to the wireless communication apparatus STA0, communication from the access point AP2 of the nearby OBSS2 to the wireless communication apparatus STA2 is also performed. Further, while communication errors occur by each other's ACK frames of the communication, because transmission power control is not performed upon retransmission of the transmission frame thereafter, collision of signals repeatedly occurs, which degrades communication efficiency.

In a transmission frame having a typical configuration, the BSS Color information for identifying the BSS, a transmission power control level (TPC Level), and parameters (Spatial Reuse) to be applied to the advanced spatial reuse technology cannot be obtained in the middle of the transmission frame. Therefore, in a case where collision of signals occurs, upon retransmission and upon return of the ACK frame, transmission power control cannot be performed, and there is a case where collision of signals repeatedly occurs.

In contrast, it is assumed, for example, that the access point AP1 illustrated in FIG. 1 transmits a transmission frame to the wireless communication apparatus STA0, and the access point AP2 illustrated in FIG. 1 transmits the transmission frame to the wireless communication apparatus STA2 at the same time.

In such a case, in the present technology, the inter-training signal illustrated in FIG. 10 and FIG. 11 is included in at least one of signals of the respective frequency channels of the transmission frame. In such a state, by performing transmission power control of the transmission frame using information obtained from the inter-training signal and transmitting signals (transmission frame) using advanced spatial reuse, it is possible to suppress occurrence of collision of signals, so that it is possible to perform communication more efficiently.

(Explanation of Transmission Processing)

Subsequently, operation of the wireless communication apparatus 11 will be described.

First, transmission processing to be performed when the wireless communication apparatus 11 transmits a transmission frame will be described. That is, transmission processing by the wireless communication apparatus 11 will be described below with reference to the flowchart in FIG. 14.

In step S11, the interface 51 receives supply of transmission data from the equipment control unit 23.

For example, in a case where the wireless communication apparatus 11 transmits transmission data to other wireless communication apparatuses, transmission data input by an application program, or the like, is supplied from the equipment control unit 23 to the transmission buffer 52 via the interface 51 of the wireless communication module 25.

In step S12, the network managing unit 53 acquires information regarding the wireless communication apparatus on a reception side.

For example, in a case where the transmission data is supplied to the transmission buffer 52, at the same time, destination information indicating a destination of the transmission data, communication partner information regarding a communication partner of the wireless communication apparatus 11, data format information indicating a data format of the transmission data, and the like, are supplied from the equipment control unit 23 to the network managing unit 53 via the interface 51.

Note that the communication partner information is information regarding the wireless communication apparatus which is a destination of the transmission data, and, for example, it can be specified from the communication partner information what kind of configuration of the transmission frame, such as a transmission frame having the configuration illustrated in FIG. 10, can be received by the wireless communication apparatus which becomes a communication partner.

The network managing unit 53 acquires the destination information, the communication partner information, and the data format information supplied in this manner, and supplies these kinds of information to the transmission frame constructing unit 54 and the wireless communication control unit 55 as necessary.

Further, the wireless communication control unit 55 supplies necessary information to the header information generating unit 56, the preamble generating unit 57, the inter-training generating unit 58, the transmission power control unit 59, and the like, on the basis of the destination information, the communication partner information, and the data format information supplied from the network managing unit 53.

The transmission frame constructing unit 54 constructs (generates) data in a unit of MPDU (hereinafter, also referred to as MPDU data) from the transmission data held in the transmission buffer 52 using the information supplied from the network managing unit 53 as necessary and supplies the MPDU data to the wireless transmission processing unit 60. That is, the transmission data is stored in the MPDU and supplied to the wireless transmission processing unit 60.

In this event, for example, the transmission frame constructing unit 54 generates MAC header information of the head of the MPDU data on the basis of the destination information and the data format information supplied from the network managing unit 53. Specifically, for example, address information included in the MAC header information is generated on the basis of the destination information.

These kinds of MPDU data correspond to MPDU-1 and MPDU-2 illustrated in, for example, FIG. 10 and FIG. 11. Note that the transmission frame constructing unit 54 also generates delimiter information as necessary as well as the MPDU data and supplies the delimiter information to the wireless transmission processing unit 60.

In step S13, the wireless communication control unit 55 acquires information regarding a frequency channel which can be utilized for wireless communication.

For example, the wireless communication control unit 55 acquires bandwidth information indicating a bandwidth of the received frame and spatial multiplexed stream number information, supplied from the header information analyzing unit 67, and information for generating channel map information supplied from the network managing unit 53, as information regarding a frequency channel which can be utilized for wireless communication. Here, the bandwidth information and the spatial multiplexed stream number information of the received frame are read out from the preamble of the received frame detected at the preamble detecting unit 66.

In addition, for example, in a case where the inter-training signal is detected from the received frame, the channel map information, or the like, read out from the inter-training signal may be acquired as the information regarding the frequency channel which can be utilized for wireless communication.

For example, the wireless communication control unit 55 can specify a usage situation of the wireless transmission path (frequency band) such as what kind of frequency channel exists as the frequency band (frequency channel) which can be utilized for wireless communication, and which frequency channel is available, that is, an available channel which is not used for transmission of the transmission frame, referring to the channel map information, or the like.

Therefore, the wireless communication control unit 55 can specify available channels which are frequency channels which can be utilized by the own apparatus from the channel map information, or the like, and can control transmission of the own signal (transmission frame) by utilizing some of the specified available channels.

In step S14, the wireless communication control unit 55 determines whether or not there is a frequency channel (band) which is an available channel among the frequency bands of the wireless transmission path on the basis of the information regarding the frequency channel which can be utilized, acquired in the processing in step S13.

In a case where it is determined in step S14 that there is no available channel, because all frequency channels are utilized, and the own transmission frame cannot be transmitted, the processing returns to step S13, and the above-described processing is repeatedly performed.

In contrast, in a case where it is determined in step S14 that there is an available channel, in step S15, the wireless communication control unit 55 sets a channel width to be utilized and a channel of the transmission frame.

That is, the wireless communication control unit 55 selects a frequency channel to be utilized for transmission of the transmission frame, that is, a frequency channel to be utilized by the own apparatus, among the available channels. Further, the wireless communication control unit 55 sets a bandwidth to be utilized for transmission of the transmission frame, that is, whether or not to bundle frequency channels, how many frequency channels should be bundled, and the like.

For example, here, a channel width (bandwidth) and a frequency channel to be utilized for transmission of the transmission frame are determined from a transmission destination of the transmission frame, that is, combination of a frequency channel which can be utilized by the wireless communication apparatus which receives the transmission frame, and a frequency channel which is not utilized by other wireless communication apparatuses at the present moment, in accordance with predetermined algorithm.

By this means, for example, as in the example illustrated in FIG. 10 and FIG. 11, which frequency channel is utilized and how the frequency channel is used are determined such as two frequency channels whose bandwidths are 20 MHz being bundled to be utilized as one broadband channel whose bandwidth is 40 MHz.

In step S16, the header information generating unit 56 sets parameters of the header information on the basis of the information supplied from the transmission frame constructing unit 54, the information supplied from the wireless communication control unit 55, or the like.

That is, the header information generating unit 56 generates the L-SIG having the configuration illustrated in, for example, FIG. 6, copies the L-SIG to be set as an RL-SIG, and, further, generates an HE-SIG-A having the configuration illustrated in, for example, FIG. 7, and supplies these kinds of information to the preamble generating unit 57. Further, the header information generating unit 56 generates information such as the L-STF, the L-LTF, the HE-STF, and the HE-LTF on the basis of the information supplied from the wireless communication control unit 55, or the like, and supplies these kinds of information to the preamble generating unit 57.

Then, the preamble generating unit 57 generates a preamble for each frequency channel to be utilized for transmission of the transmission frame using the information supplied from the wireless communication control unit 55 as necessary as well as the information supplied from the header information generating unit 56, and supplies the preamble to the wireless transmission processing unit 60. By this means, the preamble (preamble signal) having the configuration illustrated in FIG. 10 in which, for example, the L-STF, the L-LTF, the L-SIG, the RL-SIG, the HE-SIG-A, the HE-STF, and a predetermined number of HE-LTFs are sequentially arranged, is generated.

Further, the preamble generating unit 57 supplies part or all of the information used for generation of the preamble to the inter-training generating unit 58.

In step S17, the wireless communication control unit 55 determines whether or not to transmit the inter-training signal.

For example, in a case where an OBSS which overlaps with the own BSS exists around the apparatus from the BSS Color information, or the like, included in the header information of the received frame supplied from the header information analyzing unit 67, that is, in a case where a received frame of the OBSS is detected, the wireless communication control unit 55 determines to transmit the inter-training signal.

Further, for example, it is also possible to determine to transmit the inter-training signal in a case where transmission data (MPDU) is transmitted in a plurality of frequency channels, that is, in a case where a plurality of frequency channels is utilized by the wireless communication apparatus 11 itself, or the wireless communication apparatus 11 and other wireless communication apparatuses. In this event, examples of a situation where a plurality of frequency channels is utilized can include a case where, for example, each piece of transmission data (MPDU) is transmitted by each of the plurality of frequency channels, a case where the plurality of frequency channels is bundled to be set as one broadband frequency channel, and the transmission data is transmitted in the one broadband frequency channel.

In a case where it is determined in step S17 not to transmit the inter-training signal, the processing from steps S18 to S20 is skipped, and the processing proceeds to step S21.

In contrast, in a case where it is determined in step S17 to transmit the inter-training signal, in step S18, the wireless communication control unit 55 sets a frequency channel to be utilized for transmission of the inter-training signal.

For example, the wireless communication control unit 55 selects at least one of the frequency channels which are determined as available channels as a result of the processing in step S14, as a frequency channel to be utilized for transmission of the inter-training signal, that is, the management channel while the setting result in step S15 is taken into account. In this event, for example, as illustrated in FIG. 11, in a case where the management channel is switched over time, a plurality of frequency channels is selected as the management channel.

In step S19, the inter-training generating unit 58 sets parameters (information) included in the inter-signal information (Inter-SIG) in accordance with control by the wireless communication control unit 55. That is, for example, what kind of parameters such as various kinds of parameters (information) illustrated in FIG. 12 is included in the inter-signal information, is determined.

In step S20, the inter-training generating unit 58 sets a transmission interval and a transmission pattern of the inter-training signal in accordance with control by the wireless communication control unit 55.

That is, the inter-training generating unit 58 determines a length of a period from when a predetermined inter-training signal is transmitted until the next inter-training signal is transmitted as the transmission interval. Here, the transmission interval may be changed over time. That is, the inter-training signal may be transmitted at irregular intervals.

Further, as in the example illustrated in, for example, FIG. 11, in a case where the management channel is changed over time, the inter-training generating unit 58 determines a pattern of the change as the transmission pattern while the setting result in step S15 is taken into account.

In a case where the processing in step S20 is performed, or in a case where it is determined in step S17 not to transmit the inter-training signal, processing in step S21 is performed.

In step S21, the transmission power control unit 59 determines whether or not to adjust transmission power on the basis of received power of the received frame received by the wireless communication apparatus 11, supplied from the wireless reception processing unit 63 via the detection threshold control unit 64, the BSS Color information read out from the preamble, or the like, of the received frame, or the like. That is, it is determined whether or not it is necessary to adjust transmission power of the transmission frame.

Specifically, for example, in a case where a received frame of the OBSS whose received power is equal to or greater than predetermined received power is detected, it is determined that it is necessary to adjust transmission power of the transmission frame.

In step S21, in a case where it is determined not to adjust the transmission power, processing in step S22 is not performed, and, thereafter, the processing proceeds to step S23. In this case, for example, the transmission frame is transmitted at transmission power, or the like, indicated by a transmission power value determined in advance.

In contrast, in a case where it is determined in step S21 to adjust the transmission power, in step S22, the transmission power control unit 59 controls (adjusts) transmission power of the transmission frame by setting a transmission power value of the transmission frame.

Figure 15:
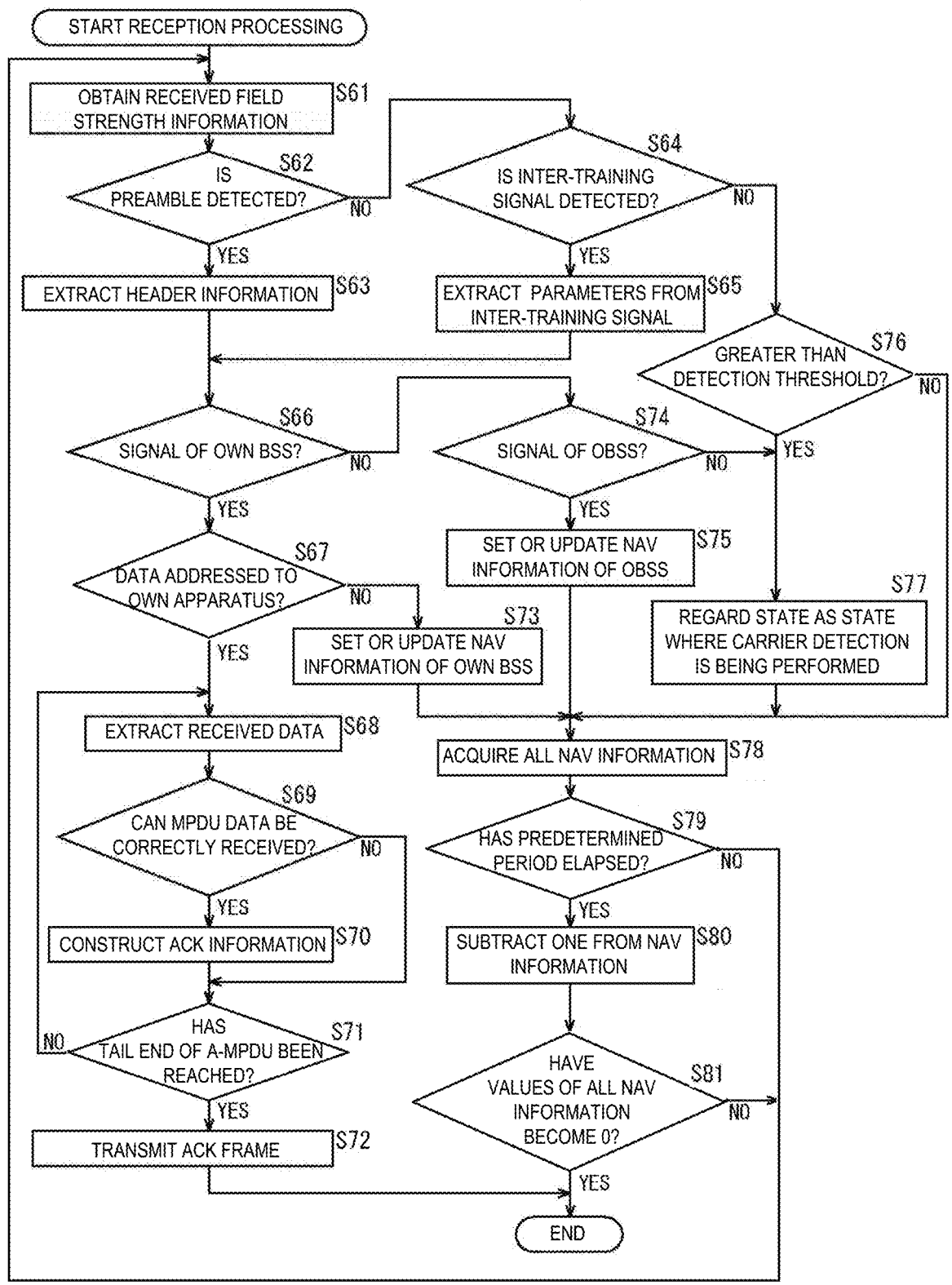
FIG. 15 is a flowchart explaining reception processing.

For example, the transmission power control unit 59 determines the transmission power of the transmission frame on the basis of the received power, or the like, of the received frame received by the wireless communication apparatus 11, supplied from the wireless reception processing unit 63 via the detection threshold control unit 64. Here, the received power of the received frame is received power indicated by, for example, received field strength information obtained in step S61 in FIG. 15 which will be described later.

In addition, for example, the transmission power of the transmission frame may be determined on the basis of the BSS Color information, the transmission power control level (TPC Level), the receiving sensitivity control level (DSC Level), or the like, read out from the inter-training signal of the received frame.

In this case, for example, it is possible to set the transmission power of the own transmission frame so as not to affect the communication in the OBSS, from the BSS to which the apparatus of the transmission source of the received frame indicated by the BSS Color information belongs and the received power of the received frame.

In a case where the transmission power value is set in the processing in step S22 or it is determined in step S21 not to adjust the transmission power, the processing in step S23 is performed.

That is, in step S23, the wireless communication control unit 55 acquires NAV information indicating a period during which transmission of a signal for the own BSS is inhibited, that is, a period during which the transmission frame cannot be transmitted.

Specifically, in a case where the transmission frame transmitted from other wireless communication apparatuses is received as the received frame at the wireless communication apparatus 11, it is possible to obtain the BSS Color information stored in the preamble and the inter-training signal of the received frame.

That is, the wireless communication control unit 55 can specify whether the received frame is a signal of the BSS or a signal of the OBSS from the BSS Color information stored in the header information or the inter-signal information, supplied from the header information analyzing unit 67.

Further, when the received frame is a signal of the BSS, the wireless communication control unit 55 can specify a timing at which transmission of the MPDU data, that is, the received frame is completed, and, further a timing for receiving an ACK frame, from the Duration information stored in the MAC header information of the MPDU data extracted from the received frame and supplied from the received data constructing unit 68 via the network managing unit 53.

On the basis of a result of specifying a timing at which transmission of the received frame is completed, the wireless communication control unit 55 generates NAV information indicating a period required to enable the own apparatus to start transmitting the transmission frame after the timing from the current time, as NAV information of the own BSS. Such NAV information can be said as information indicating a communication situation in the BSS.

Note that it is also possible to reset the NAV information every time the MPDU data is newly received. Further, length information, or the like, extracted from the header information and the inter-training signal of the received frame may be used for generation of the NAV information.

Here, a value of the NAV information of the BSS is decremented by one every time a predetermined time period elapses, and, when the value of the NAV information becomes 0, it becomes possible to transmit the own transmission frame.

In step S24, the wireless communication control unit 55 determines whether or not to transmit the transmission frame using advanced spatial reuse.

In a case where it is determined in step S24 to transmit the transmission frame using advanced spatial reuse, in step S25, the wireless communication control unit 55 acquires the NAV information of the OBSS.

That is, the wireless communication control unit 55 generates the NAV information of the OBSS from the length information, the Duration information, or the like, obtained from the preamble, the inter-training signal, or the like, of the received frame which is determined as a signal of the OBSS in a similar manner to upon acquisition of the NAV information of the BSS in step S23. If the NAV information of the OBSS can be obtained, thereafter, the processing proceeds to step S26.

In this manner, the wireless communication apparatus 11 can efficiently perform communication using advanced spatial reuse by specifying whether the received frame is a signal of the BSS or the OBSS, or the like, by acquiring the BSS Color information from the received frame and obtaining the NAV information of the BSS and the OBSS.

In the present technology, because the BSS Color information specifying the BSS and the OBSS is also stored in the inter-training signal as well as in the preamble, even if reception is performed in the middle of the received frame, it is possible to specify whether the received frame is a signal of the BSS or a signal of the OBSS.

Therefore, the wireless communication control unit 55 can obtain NAV information indicating a communication situation of each of the wireless networks concerning the BSS and each OBSS. In other words, the wireless communication control unit 55 can individually manage communication situations of the wireless networks for each of the wireless networks using the NAV information, that is, on the basis of the BSS Color information, the length information, and the Duration information.

Note that, in step S25, the NAV information of the OBSS may be generated only in a case where the wireless communication apparatus 11 is in a dense environment where a number of wireless communication apparatuses exist around the wireless communication apparatus 11, and it is predicted that traffic becomes crowded.

Meanwhile, in a case where it is determined in step S24 not to transmit the transmission frame using the advanced spatial reuse, the processing thereafter proceeds to step S26.

If it is determined in step S24 not to transmit the transmission frame using the advanced spatial reuse, or processing in step S25 is performed, processing in step S26 is performed.

That is, in step S26, the wireless communication control unit 55 determines whether or not transmission right of the transmission frame is acquired on the basis of the NAV information.

Basically, if, for example, values of all the NAV information on the wireless transmission path become 0, and a signal having received power equal to or greater than a threshold of predetermined received field strength (received power) is not detected during an inter-frame space period, it is determined that transmission right is acquired.

Further, for example, in a case where the transmission frame is transmitted using the advanced spatial reuse, even if a value of the NAV information of the OBSS is not 0, if the value of the NAV information of the BSS is 0, and it is possible to transmit the transmission frame without affecting the OBSS, it may be determined that the transmission right is acquired.

Specifically, it is, for example, assumed that the received frame received by the wireless communication apparatus 11 is a signal of the OBSS, and the received power is equal to or less than predetermined power. In this case, the wireless communication control unit 55 determines that the transmission right of the transmission frame is acquired, and controls transmission of the transmission frame by the wireless transmission processing unit 60 so that the transmission frame is transmitted at transmission power determined by the transmission power control unit 59.

In a case where it is determined in step S26 that the transmission right is not acquired, the wireless communication control unit 55 decrements each of the held value of the NAV information of the BSS and the held value of the NAV information of the OBSS by one after a predetermined period has elapsed, and, thereafter, the processing returns to step S26. That is, the processing in step S26 is repeatedly performed until the transmission right is acquired.

In contrast, in a case where it is determined in step S26 that the transmission right is acquired, in step S27, the wireless transmission processing unit 60 transmits the MPDU of the transmission frame.

That is, in a case of a head portion of the transmission frame, the wireless transmission processing unit 60 performs processing of converting into a baseband signal, modulation processing, or the like, on the preamble supplied from the preamble generating unit 57, and supplies a transmission signal obtained as a result to the antenna control unit 61. In this event, the preamble (preamble signal) is transmitted for each frequency channel.

Further, after transmission of the preamble signal, the wireless transmission processing unit 60 performs processing of converting into a baseband signal, modulation processing, or the like, on the MPDU data supplied from the transmission frame constructing unit 54, and supplies a transmission signal obtained as a result to the antenna control unit 61.

The antenna control unit 61 causes the transmission signal supplied from the wireless transmission processing unit 60 to be output from the antenna 62. In this event, when transmission power is adjusted, the wireless transmission processing unit 60 and the antenna control unit 61 operate so that the transmission signal, that is, the preamble and the MPDU data of the transmission frame are transmitted at transmission power indicated by the transmission power value set in step S22 or the like, in accordance with control the transmission power control unit 59.

Through the processing in step S27, of the transmission frame, a portion of the preamble which is the head portion of the transmission frame, and a portion of the MPDU subsequent to the preamble are transmitted. In this event, for example, in a case where a plurality of frequency channels is bundled to be utilized as one broadband channel, the MPDU data is transmitted by utilizing a band of the channel.

Note that, in a case where the delimiter information is also transmitted along with the MPDU data, after the delimiter information is transmitted, the MPDU data arranged immediately after the delimiter information is transmitted.

In step S28, the inter-training generating unit 58 determines whether or not it is a timing for transmitting the inter-training signal on the basis of the transmission interval and the transmission pattern of the inter-training signal determined in the processing in step S20.

In step S28, in a case where it is determined that it is not yet a timing for transmitting the inter-training signal, the processing returns to step S28, and the above-described processing is repeatedly performed.

Meanwhile, in a case where it is determined in step S28 that it is a timing for transmitting the inter-training signal, in step S29, the inter-training generating unit 58 acquires parameters of the inter-signal information (Inter-SIG).

That is, the inter-training generating unit 58 acquires parameters of the inter-signal information (Inter-SIG) determined in the processing in step S19 from the preamble generating unit 57 and the wireless communication control unit 55, and generates the inter-signal information from the acquired parameters. Here, for example, information regarding a remaining period of an A-MPDU, that is, respective parameters (information) illustrated in FIG. 12, such as the length information, the BSS Color information, and the channel map information are acquired, and the inter-signal information (Inter-SIG) having the configuration illustrated in FIG. 12 is generated.

Further, the inter-training generating unit 58 generates the inter-training signal by arranging information such as the L-STF, the L-LTF, and the L-SIG supplied from the preamble generating unit 57 and the wireless communication control unit 55, and the generated inter-signal information. By this means, for example, the inter-training signal having the configuration illustrated in FIG. 10 can be obtained.

The inter-training generating unit 58 supplies the inter-training signal generated in this manner to the wireless transmission processing unit 60.

In step S30, the wireless transmission processing unit 60 transmits the inter-training signal of the transmission frame.

That is, the wireless transmission processing unit 60 performs processing of converting into a baseband signal, modulation processing, or the like, on the inter-training signal supplied from the inter-training generating unit 58 and supplies the transmission signal obtained as a result to the antenna control unit 61.

Further, the antenna control unit 61 causes the transmission signal supplied from the wireless transmission processing unit 60 to be output from the antenna 62.

In this event, the wireless transmission processing unit 60 and the antenna control unit 61 operate so that the transmission signal, that is, the inter-training signal of the transmission frame is transmitted at transmission power indicated by the transmission power value set in step S22 or the like, in accordance with control by the transmission power control unit 59.

Through the processing as described above, at the wireless communication apparatus 11, during a transmission period of the MPDU data, that is, while the MPDU data is transmitted, the inter-training signal is transmitted at the transmission interval and with the transmission pattern set in step S20.

That is, the wireless transmission processing unit 60 transmits the next inter-training signal after a predetermined period indicated by the transmission interval has elapsed since the immediately preceding inter-training signal had been transmitted. In this event, the wireless transmission processing unit 60 switches a frequency channel to be utilized for transmission of the inter-training signal as necessary over time in accordance with the transmission pattern.

As a result, for example, the inter-training signal is stored in the transmission frame with a pattern illustrated in FIG. 10 or FIG. 11, and the transmission frame including the inter-training signal is transmitted.

In step S31, the wireless communication control unit 55 determines whether or not a tail end of the MPDU data has been reached for the individual pieces of the MPDU data transmitted using the respective frequency channels.

In step S31, in a case where it is determined that any tail end of the MPDU data has not been reached, that is, all the MPDU data is being transmitted, the processing returns to step S28, and the above-described processing is repeatedly performed. That is, transmission of the MPDU is continuously performed, and the inter-training signal is repeatedly transmitted at determined transmission intervals.

In contrast, in a case where it is determined in step S31 that the tail end of the MPDU data has been reached, in step S32, the wireless communication control unit 55 determines whether or not a tail end of the A-MPDU has been reached, that is, whether or not a tail end of the transmission frame has been reached.

In a case where it is determined in step S32 that the tail end has not been reached, because the MPDU data and the inter-training signal are still transmitted, the processing returns to step S27, and the above-described processing is repeatedly performed.

In contrast, in a case where it is determined in step S32 that the tail end has been reached, in step S33, the wireless reception processing unit 63 receives an ACK frame.

That is, when the transmission frame transmitted by the wireless communication apparatus 11 is received by a wireless communication apparatus of a communication partner, the wireless communication apparatus of the communication partner transmits an ACK frame to the wireless communication apparatus 11.

In a case where received power of the received frame supplied from the antenna 62 via the antenna control unit 61 is equal to or greater than the detection threshold supplied from the detection threshold control unit 64, the wireless reception processing unit 63 regards the received frame as being received. That is, detection of the preamble and the inter-training signal is performed for the received frame.

The preamble detecting unit 66 detects the preamble from the received frame by detecting a predetermined sequence pattern which is a preamble portion from the received frame received at the wireless reception processing unit 63. If the preamble is detected, the preamble detecting unit 66 supplies the detection result to the wireless communication control unit 55 and the header information analyzing unit 67.

The header information analyzing unit 67 extracts the header information, or the like, from the received frame received at the wireless reception processing unit 63 in accordance with the detection result supplied from the preamble detecting unit 66 and supplies the header information, or the like, to the received data constructing unit 68.

Further, the received data constructing unit 68 extracts the received data stored in the MPDU data from the received frame received at the wireless reception processing unit 63 on the basis of the header information, or the like, supplied from the header information analyzing unit 67 and supplies the received data to the reception buffer 69 and the network managing unit 53.

In a case where the received frame received in this manner is the ACK frame, because information indicating which received data, that is, which MPDU data is correctly received can be obtained, the network managing unit 53 supplies the information obtained from the ACK frame to the wireless communication control unit 55.

In step S34, the wireless communication control unit 55 determines whether or not the ACK frame indicating that all the transmitted transmission data (MPDU data) of the transmission frame is correctly received, is received.

For example, in a case where information indicating that all the MPDU data included in the transmitted transmission frame is correctly received is supplied from the network managing unit 53, the wireless communication control unit 55 determines that the ACK frame indicating that all the MPDU data of the transmission frame is correctly received is received. By this means, the transmission frame is correctly received by the wireless communication apparatus of the communication partner.

In a case where it is determined in step S34 that the ACK frame indicating that all the MPDU data of the transmission frame is correctly received is not received, the processing returns to step S16, and the above-described processing is repeatedly performed.

In this case, while the transmission frame is retransmitted because the transmission frame is not correctly received, because transmission power is appropriately controlled in step S22 as necessary upon the retransmission, communication is performed more efficiently.

In contrast, in a case where it is determined in step S34 that the ACK frame indicating that all the MPDU data of the transmission frame is correctly received is received, because the transmission frame is correctly received on the communication partner side, the transmission processing is finished.

As described above, the wireless communication apparatus 11 transmits the transmission frame in which part of the header information is stored in the inter-training signal. By this means, it is possible to perform communication more efficiently.

(Description of Reception Processing)

Subsequently, reception processing to be performed when the wireless communication apparatus 11 receives the received frame transmitted from the communication partner will be described. That is, reception processing by the wireless communication apparatus 11 will be described below with reference to the flowchart in FIG. 15.

When the reception processing is started, the wireless communication apparatus 11 first causes operation of each block which functions as a receiver of the own apparatus to start, to receive the received frame addressed to the own apparatus.

Then, in step S61, the wireless reception processing unit 63 detects received power of the received frame supplied from the antenna 62 via the antenna control unit 61, that is, received field strength, and obtains received field strength information indicating the received power (signal detection level).

In this event, for example, if the received power of the received frame obtained (detected) by the wireless reception processing unit 63 is equal to or greater than the detection threshold supplied from the detection threshold control unit 64, detection of the preamble and the inter-training signal is performed for the received frame. Note that, more particularly, detection of the preamble and the inter-training signal is performed also for a received frame whose received power is less than the detection threshold.

The inter-training detecting unit 65 detects the inter-training signal from the received frame by detecting a predetermined sequence pattern of the inter-training signal portion from the received frame received at the wireless reception processing unit 63. Here, processing of detecting the inter-training signal from the received signal (received frame) is performed for the entire band constituting the frequency band which can be utilized for wireless communication, that is, all the frequency channels.

Further, the preamble detecting unit 66 detects a preamble from the received frame by detecting a predetermined sequence pattern of the preamble portion from the received frame received at the wireless reception processing unit 63.

Note that, at the detection threshold control unit 64, processing of setting the preamble detection threshold of the BSS from a predetermined received field strength level, and determining a detection threshold OBSS PD in accordance with a maximum value and a minimum value of the detection threshold determined in advance on the basis of the transmission power of the frame to be transmitted for the preamble detection threshold of the OBSS, is performed.

For example, preamble detection is first determined from the threshold of the received power of the received frame, and, thereafter, in a case where it is determined that the received frame is a signal from the OBSS, determination of the detection threshold of OBSS PD is performed in accordance with the transmission power of the frame to be transmitted.

Here, the received power of the received frame of the BSS or the OBSS supplied from the wireless reception processing unit 63 is received power indicated by the received field strength information obtained in the processing in step S61. It is possible to specify whether the received power indicated by this received field strength information is a signal of the BSS or a signal of the OBSS, from the BSS Color information supplied from the wireless communication control unit 55.

In step S62, the preamble detecting unit 66 determines whether or not the preamble is detected from the received frame.

In a case where it is determined in step S62 that the preamble is detected, the preamble detecting unit 66 supplies the detection result to the wireless communication control unit 55 and the header information analyzing unit 67, and the processing proceeds to step S63.

In step S63, the header information analyzing unit 67 extracts the header information, or the like, from the detected preamble on the basis of the detection result supplied from the preamble detecting unit 66, supplies the header information, or the like, to the wireless communication control unit 55 and the received data constructing unit 68, and, thereafter, the processing proceeds to step S66. By this means, a PLOP header, that is, the header information formed with the L-SIG, the RL-SIG, and the HE-SIG-A is extracted from the preamble of the received frame.

In contrast, in a case where it is determined in step S62 that the preamble is not detected, in step S64, the inter-training detecting unit 65 determines whether or not the inter-training signal is detected from the received frame.

In a case where it is determined in step S64 that the inter-training signal is detected, the inter-training detecting unit 65 supplies the detection result of the inter-training signal to the header information analyzing unit 67, and, thereafter, the processing proceeds to step S65.

In step S65, the header information analyzing unit 67 extracts various kinds of parameters from the inter-training signal of the received frame received at the wireless reception processing unit 63 on the basis of the detection result supplied from the inter-training detecting unit 65, and, thereafter, the processing proceeds to step S66.

That is, the header information analyzing unit 67 extracts various kinds of parameters stored in the L-SIG and the inter-signal information (Inter-SIG) from the inter-training signal and supplies the various kinds of parameters to the wireless communication control unit 55 and the received data constructing unit 68.

Because the header information analyzing unit 67 can obtain the BSS Color information, or the like, for example, as the parameters stored in the inter-signal information, even when the received frame is detected in the middle of the frame, it is possible to specify whether the received frame is a signal of the BSS or a signal of the OBSS, so that it is possible to perform communication more efficiently.

In addition, because it is possible to obtain parameters, or the like, regarding the advanced spatial reuse technology from the inter-signal information, even when the received frame is received in the middle of the frame, it is possible to decode the received frame, that is, extract the received data.

Further, because it is possible to obtain channel map information, or the like, from the inter-signal information, even when the received frame is received in the middle of the frame, the wireless communication control unit 55 can specify (recognize) a usage situation of the wireless transmission path, that is, the frequency channels.

Further, if the preamble and the inter-training signal are detected from the received frame, the received data constructing unit 68 analyzes the MAC header information stored in the MPDU data from the received frame received at the wireless reception processing unit 63 on the basis of the header information, or the like, supplied from the header information analyzing unit 67.

By this means, it is possible to obtain address information indicated by characters "Address" within the MAC header information illustrated in, for example, FIG. 8, and the received data constructing unit 68 supplies the obtained address information to the wireless communication control unit 55 via the network managing unit 53.

If the processing in step S63 or step S65 is performed, in step S66, the wireless communication control unit 55 determines whether or not the received frame received is a signal of the own BSS.

For example, the wireless communication control unit 55 determines that the received frame is a signal of the own BSS in a case where the BSS Color information read out from the header information and the inter-signal information supplied from the header information analyzing unit 67 is information indicating the BSS to which the wireless communication apparatus 11 belongs.

In a case where it is determined in step S66 that the received frame is a signal of the own BSS, in step S67, the wireless communication control unit 55 determines whether or not the received frame received is data (received frame) addressed to the own apparatus.

For example, in a case where the address information supplied from the received data constructing unit 68 via the network managing unit 53 indicates the own apparatus, that is, the wireless communication apparatus 11, the wireless communication control unit 55 determines that the received frame is data addressed to the own apparatus. Further, for example, it may be determined whether the received frame is data addressed to the own apparatus from information of part of the address (AID12) indicating the wireless communication apparatus of a transmission source or a recipient of the transmission frame, or the like, read out from the inter-signal information.

In a case where it is determined in step S67 that the received frame is data addressed to the own apparatus, the processing proceeds to step S68.

In step S68, the received data constructing unit 68 extracts received data stored in one piece of the MPDU data from the received frame received at the wireless reception processing unit 63 on the basis of the header information, the delimiter information, or the like, supplied from the header information analyzing unit 67. That is, the received data is extracted in units of the MPDU.

The received data constructing unit 68 supplies the extracted received data to the network managing unit 53 and the reception buffer 69. The received data held at the reception buffer 69 is supplied to the equipment control unit 23 via the interface 51.

In step S69, the received data constructing unit 68 determines whether or not the MPDU data, that is, the received data in units of the MPDU can be correctly received as a result of step S68.

In a case where it is determined in step S69 that the MPDU data can be correctly received, in step S70, the received data constructing unit 68 constructs (generates) ACK information indicating that the MPDU data is correctly received, and supplies the ACK information to the wireless communication control unit 55 via the network managing unit 53. If the ACK information is generated, thereafter, the processing proceeds to step S71.

In contrast, in a case where it is determined in step S69 that the MPDU data cannot be correctly received, the processing in step S70 is not performed, and, thereafter, the processing proceeds to step S71.

In a case where it is determined in step S69 that the MPDU data cannot be correctly received or the processing in step S70 is performed, thereafter, the processing in step S71 is performed.

That is, in step S71, the wireless communication control unit 55 determines whether or not a tail end of the aggregated A-MPDU has been reached, that is, whether or not a tail end of the received frame has been reached, on the basis of the header information, or the like, supplied from the header information analyzing unit 67.

In a case where it is determined in step S71 that the tail end of the A-MPDU has not been reached yet, the processing returns to step S68, and the above-described processing is repeatedly performed.

In contrast, in a case where it is determined in step S71 that the tail end of the A-MPDU has been reached, in step S72, the wireless transmission processing unit 60 transmits an ACK frame.

That is, the wireless communication control unit 55 controls the header information generating unit 56 and the preamble generating unit 57 on the basis of the ACK information supplied from the received data constructing unit 68 to generate the preamble of the ACK frame. The preamble generating unit 57 generates the preamble using the information supplied from the header information generating unit 56 and the wireless communication control unit 55 as necessary and supplies the preamble to the wireless transmission processing unit 60.

Further, the network managing unit 53 controls the transmission frame constructing unit 54 as necessary on the basis of the ACK information supplied from the received data constructing unit 68 to generate and supply the MPDU data of the ACK frame to the wireless transmission processing unit 60.

The wireless transmission processing unit 60 performs processing of converting into a baseband signal, modulation processing, or the like, on the ACK frame formed with the preamble supplied from the preamble generating unit 57 and the MPDU data supplied from the transmission frame constructing unit 54, and supplies the ACK frame obtained as a result to the antenna control unit 61.

Further, the antenna control unit 61 causes the ACK frame supplied from the wireless transmission processing unit 60 to be output from the antenna 62. In this event, the wireless transmission processing unit 60 and the antenna control unit 61 operate so that the ACK frame is transmitted at transmission power, for example, set through processing in step S22 in FIG. 14, or the like, in accordance with control by the transmission power control unit 59.

For example, the information indicating the correctly received MPDU data is included in the ACK frame to be transmitted by the wireless transmission processing unit 60. When the ACK frame is transmitted in this manner, the reception processing is finished.

Further, in a case where it is determined in step S67 that the received frame is not data addressed to the own apparatus, that is, in a case where, while the BSS Color information included in the received frame is information indicating the own BSS, the received frame is not addressed to the own apparatus, the processing proceeds to step S73.

In step S73, the wireless communication control unit 55 sets or updates the NAV information of the own BSS.

Figure 14:
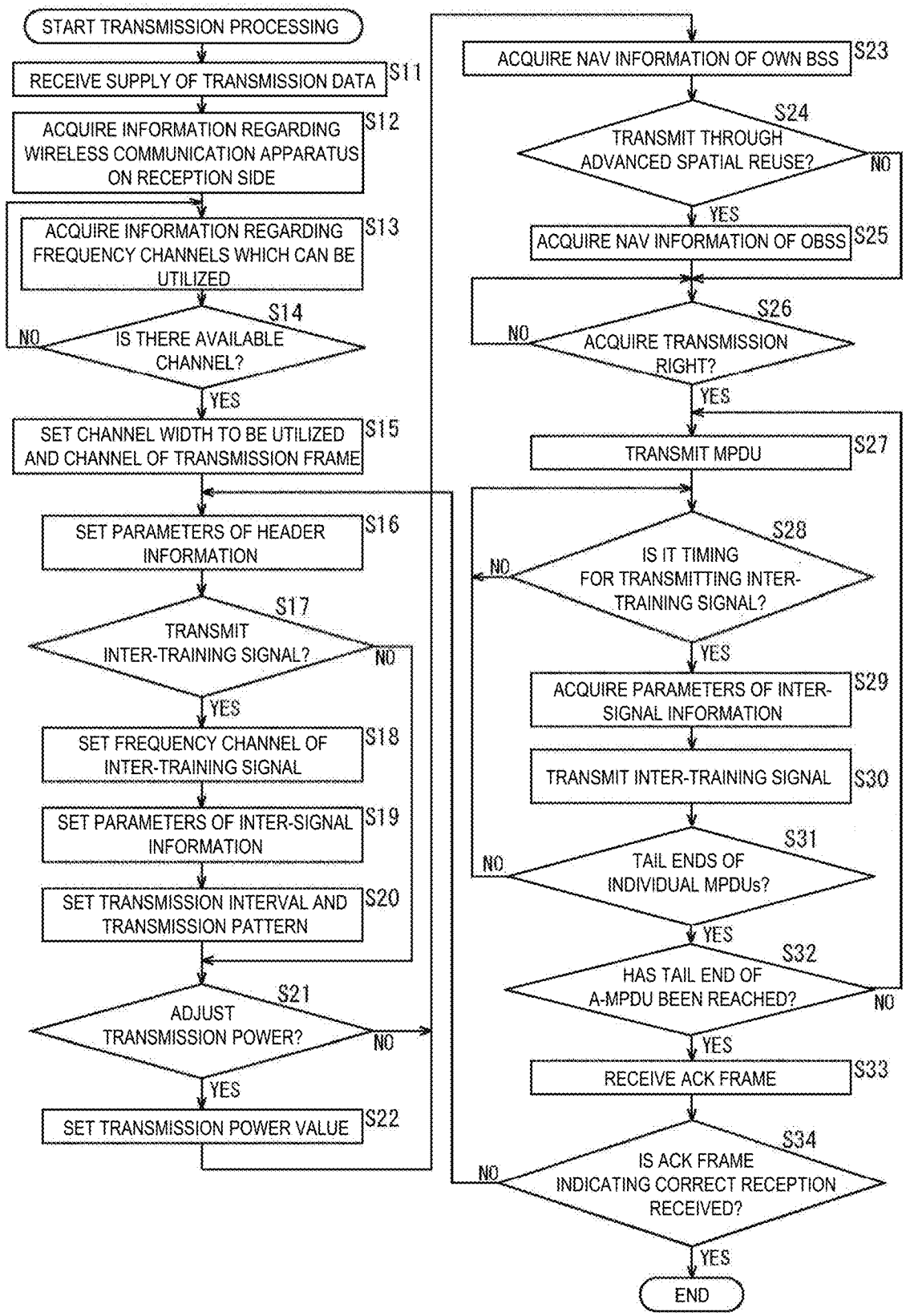
FIG. 14 is a flowchart explaining transmission processing.

That is, in a case where the wireless communication control unit 55 does not hold the NAV information of the own BSS, the wireless communication control unit 55 generates NAV information of the own BSS in a similar manner to a case in step S23 in FIG. 14.

For example, the NAV information of the BSS is generated from the Duration information stored in the MAC header information of the MPDU data supplied from the received data constructing unit 68 via the network managing unit 53, the length information supplied from the header information analyzing unit 67, or the like.

Further, in a case where the wireless communication control unit 55 has already held the NAV information of the own BSS, the wireless communication control unit 55 updates the held NAV information on the basis of the Duration information, or the like, stored in the MAC header information of the newly received MPDU data.

In a case where, while the BSS Color information included in the received frame is information indicating the own BSS, the received frame is not addressed to the own apparatus, communication for transmission and reception of the received frame is performed for a period indicated by the Duration information stored in the MAC header information.

In a case where the NAV information of the own BSS is generated or updated in this manner, thereafter, the processing proceeds to step S78.

Further, in a case where it is determined in step S66 that the received frame is not a signal of the own BSS, in step S74, the wireless communication control unit 55 determines whether or not the received frame received is a signal of the OBSS.

For example, in a case where the BSS Color information included in the header information and the inter-signal information is supplied from the header information analyzing unit 67, the wireless communication control unit 55 determines that the received frame is a signal of the OBSS if the BSS Color information is information indicating other BSSs to which the wireless communication apparatus 11 does not belong, that is, the OBSS.

In a case where it is determined in step S74 that the received frame is a signal of the OBSS, in step S75, the wireless communication control unit 55 sets or updates the NAV information of the OBSS.

That is, in step S75, the NAV information of the OBSS is generated or updated by processing similar to that in step S73 being performed. Note that the NAV information of the OBSS may be generated for each OBSS, or only NAV information of the OBSS whose duration is the longest among a plurality of OBSSs may be set (generated) and managed.

By managing the NAV information for each of the wireless networks for the BSS and the respective OBSSs also upon reception processing in a similar manner to upon transmission processing, the wireless communication control unit 55 can individually manage the communication situations of the respective wireless networks using the NAV information.

When the NAV information of the OBSS is set or updated, thereafter, the processing proceeds to step S78.

Meanwhile, in a case where it is determined in step S74 that the received frame is not a signal of the OBSS, thereafter, the processing proceeds to step S77.

Further, in a case where it is determined in step S64 that the inter-training signal has not been detected, the processing proceeds to step S76.

In step S76, the wireless communication control unit 55 determines whether or not the received power of the received frame received at the wireless reception processing unit 63 is greater than the detection threshold determined at the detection threshold control unit 64.

In a case where it is determined in step S76 that the received power is greater than the detection threshold, thereafter, the processing proceeds to step S77.

In a case where it is determined in step S76 that the received power is greater than the detection threshold, or in a case where it is determined in step S74 that the received frame is not a signal of the OBSS, processing in step S77 is performed. That is, in step S77, the wireless communication control unit 55 regards the state as a state where carrier detection is being performed, and, thereafter, the processing proceeds to step S78.

In this case, while neither the preamble nor the inter-training signal has been detected for the received frame, because a signal having great received power is detected, the state is regarded as a state where carrier detection is being performed, and processing of detecting the preamble and the inter-training signal from the signal being received (received frame) is continuously performed. Note that, in a state where carrier detection is being performed, the wireless communication apparatus 11 cannot transmit the transmission frame.

In contrast, in a case where it is determined in step S76 that the received power is equal to or less than the detection threshold, the state is not regarded as a state where carrier detection is being performed, and, thereafter, the processing proceeds to step S78.

Further, in a case where the processing in step S73 is performed, the processing in step S75 is performed, the processing in step S77 is performed, or it is determined in step S76 that the received power is equal to or less than the detection threshold, processing in step S78 is performed.

That is, in step S78, the wireless communication control unit 55 acquires all the NAV information. Specifically, the wireless communication control unit 55 reads out the NAV information of the own BSS obtained in step S73, and the NAV information of the OBSS obtained in step S75, and recognizes communication situations of the BSS and the OBSS indicated by the NAV information.

In step S79, the wireless communication control unit 55 determines whether or not a predetermined period has elapsed since the NAV information had been updated last.

In a case where it is determined in step S79 that the predetermined period has not elapsed yet, the processing returns to step S61, and the above-described processing is repeatedly performed.

In contrast, in a case where it is determined in step S79 that the predetermined period has elapsed, in step S80, the wireless communication control unit 55 subtracts one from respective values of the NAV information of the own BSS and the NAV information of the OBSS. That is, the values of the NAV information are decremented.

In step S81, the wireless communication control unit 55 determines whether or not the values of all the NAV information become 0.

In a case where it is determined in step S81 that the values of all the NAV information do not become 0, the processing returns to step S61, and the above-described processing is repeatedly performed.

In contrast, in a case where it is determined in step S81 that the values of all the NAV information become 0, the reception processing is finished.

As described above, the wireless communication apparatus 11 detects the inter-training signal in which part of the header information is stored, from the received frame, and extracts the part of the header information from the inter-training signal. By this means, it is possible to perform communication more efficiently.

Configuration Example of Computer

Incidentally, the above-described series of processes may be performed by hardware or may be performed by software. In a case where the series of processes is performed by software, a program forming the software is installed into a computer. Here, examples of the computer include a computer that is incorporated in dedicated hardware, a general-purpose personal computer that can perform various types of function by installing various types of program, and the like.

FIG. 16 is a block diagram illustrating a configuration example of the hardware of a computer that performs the above-described series of processes with a program.

In the computer, a CPU 501, read only memory (ROM) 502, and random access memory (RAM) 503 are mutually connected by a bus 504.

Further, an input/output interface 505 is connected to the bus 504. Connected to the input/output interface 505 are an input unit 506, an output unit 507, a recording unit 508, a communication unit 509, and a drive 510.

The input unit 506 includes a keyboard, a mouse, a microphone, an image sensor, and the like. The output unit 507 includes a display, a speaker, and the like. The recording unit 508 includes a hard disk, a non-volatile memory, and the like. The communication unit 509 includes a network interface, and the like. The drive 510 drives a removable recording medium 511 such as a magnetic disk, an optical disc, a magneto-optical disk, and a semiconductor memory.

In the computer configured as described above, the CPU 501 loads a program that is recorded, for example, in the recording unit 508 onto the RAM 503 via the input/output interface 505 and the bus 504, and executes the program, thereby performing the above-described series of processes.

For example, programs to be executed by the computer (CPU 501) can be recorded and provided in the removable recording medium 511, which is a packaged medium or the like. In addition, programs can be provided via a wired or wireless transmission medium such as a local area network, the Internet, and digital satellite broadcasting.

In the computer, by mounting the removable recording medium 511 onto the drive 510, programs can be installed into the recording unit 508 via the input/output interface 505. Programs can also be received by the communication unit 509 via a wired or wireless transmission medium, and installed into the recording unit 508. In addition, programs can be installed in advance into the ROM 502 or the recording unit 508.

Note that a program executed by the computer may be a program in which processes are chronologically carried out in a time series in the order described herein or may be a program in which processes are carried out in parallel or at necessary timing, such as when the processes are called.

In addition, embodiments of the present technology are not limited to the above-described embodiments, and various alterations may occur insofar as they are within the scope of the present disclosure.

For example, the present technology can adopt a configuration of cloud computing, in which a plurality of devices shares a single function via a network and performs processes in collaboration.

Furthermore, each step in the above-described flowcharts can be executed by a single device or shared and executed by a plurality of devices.

In addition, in a case where a single step includes a plurality of processes, the plurality of processes included in the single step can be executed by a single device or shared and executed by a plurality of devices.

Additionally, the present technology may also configured as below.

(1)

A wireless communication apparatus including:

a preamble generating unit configured to generate a preamble signal including header information;

an inter-training generating unit configured to generate an inter-training signal including at least part of information of the header information; and a wireless transmission processing unit configured to transmit transmission data after transmitting the preamble signal in at least one or more frequency channels among a plurality of the frequency channels and transmit a plurality of the inter-training signals by utilizing one or a plurality of the frequency channels among the plurality of the frequency channels during a transmission period of the transmission data.

(2)

The wireless communication apparatus according to (1), in which the inter-training signal includes a training sequence included in the preamble signal.

(3)

The wireless communication apparatus according to (1) or (2), in which the inter-training signal includes at least one of information regarding the frequency channels to be utilized for transmission of the transmission data, information for identifying a wireless network to which the wireless communication apparatus belongs, or information regarding the transmission period of the transmission data.

(4)

The wireless communication apparatus according to any one of (1) to (3), in which the inter-training signal includes at least one of coding and modulation scheme information of a signal to be transmitted by the wireless transmission processing unit, transmission power information, receiving sensitivity information, information regarding a spatial reuse technology, or information regarding a wireless communication apparatus of a recipient of a signal.

(5)

The wireless communication apparatus according to any one of (1) to (4), in which the wireless transmission processing unit repeatedly transmits the inter-training signal by utilizing one of the frequency channels.

(6)

The wireless communication apparatus according to any one of (1) to (4), in which the wireless transmission processing unit switches the frequency channel to be utilized for transmission of the inter-training signal over time.

(7)

The wireless communication apparatus according to any one of (1) to (6), in which the wireless transmission processing unit transmits the inter-training signal before transmission of the transmission data or after transmission of the transmission data in one of the frequency channels.

(8)

The wireless communication apparatus according to any one of (1) to (7), in which the wireless transmission processing unit intermittently transmits the next inter-training signal after a predetermined period has elapsed since the inter-training signal had been transmitted.

(9)

The wireless communication apparatus according to any one of (1) to (8), in which the wireless transmission processing unit transmits the inter-training signal in one of the frequency channels in a case where the transmission data is transmitted using a plurality of the frequency channels.

(10)

A wireless communication method to be performed by a wireless communication apparatus, including:

generating a preamble signal including header information;

generating an inter-training signal including at least part of information of the header information; and transmitting transmission data after transmitting the preamble signal in at least one or more frequency channels among a plurality of the frequency channels and transmitting a plurality of the inter-training signals by utilizing one or a plurality of the frequency channels among the plurality of the frequency channels during a transmission period of the transmission data.

(11)

A program for causing a computer to execute processing including steps of:

generating a preamble signal including header information;

generating an inter-training signal including at least part of information of the header information; and transmitting transmission data after transmitting the preamble signal in at least one or more frequency channels among a plurality of the frequency channels, and transmitting a plurality of the inter-training signals by utilizing one or a plurality of the frequency channels among the plurality of the frequency channels during a transmission period of the transmission data.

(12)

A wireless communication apparatus including:

an inter-training detecting unit configured to detect an inter-training signal including at least part of information of header information included in a preamble signal from a received signal in one or a plurality of frequency channels among a plurality of the frequency channels; and a wireless communication control unit configured to specify usage situations of the plurality of frequency channels on the basis of the detected inter-training signal.

(13)

The wireless communication apparatus according to (12), in which the inter-training signal includes at least one of information regarding the frequency channels to be utilized for transmission of a signal, information for identifying a wireless network to which a transmission source of a signal belongs, or information regarding a transmission period of a signal.

(14)

The wireless communication apparatus according to (13), in which the wireless communication control unit specifies the frequency channels which are available to the wireless communication apparatus on the basis of information described in the inter-training signal and controls transmission of a signal utilizing the specified frequency channels.

(15)

The wireless communication apparatus according to (13) or (14), in which the wireless communication control unit determines whether transmission right of a signal of the wireless communication apparatus is acquired, on the basis of information described in the inter-training signal.

(16)

The wireless communication apparatus according to any one of (13) to (15), in which the wireless communication control unit sets a period during which transmission of a signal of the wireless communication apparatus is inhibited, on the basis of information described in the inter-training signal.

(17)

The wireless communication apparatus according to any one of (12) to (16), in which the inter-training signal includes at least one of coding and modulation scheme information of a signal, transmission power information, receiving sensitivity information, information regarding a spatial reuse technology, or information regarding a wireless communication apparatus of a recipient of a signal.

(18)

The wireless communication apparatus according to any one of (12) to (17), further including:

a transmission power control unit configured to control transmission power of a signal of the wireless communication apparatus on the basis of information described in the inter-training signal.

(19)

A wireless communication method to be performed by a wireless communication apparatus, including:

detecting an inter-training signal including at least part of information of header information included in a preamble signal from a received signal in one or a plurality of frequency channels among a plurality of the frequency channels; and specifying usage situations of the plurality of the frequency channels on the basis of the detected inter-training signal.

(20)

A program for causing a computer to execute processing including steps of:

detecting an inter-training signal including at least part of information of header information included in a preamble signal from a received signal in one or a plurality of frequency channels among a plurality of the frequency channels; and specifying usage situations of the plurality of the frequency channels on the basis of the detected inter-training signal.

REFERENCE SIGNS LIST

11 Wireless communication apparatus
53 Network managing unit
54 Transmission frame constructing unit
55 Wireless communication control unit 56 Header information generating unit
57 Preamble generating unit
58 Inter-training generating unit
59 Transmission power control unit
60 Wireless transmission processing unit
63 Wireless reception processing unit
65 Inter-training detecting unit
66 Preamble detecting unit
67 Header information analyzing unit
68 Received data constructing unit

The invention claimed is:

1. A wireless communication apparatus comprising:
a preamble generating circuit configured to generate a preamble signal including header information;
an inter-training generating circuit configured to generate an inter-training signal including at least part of information of the header information; and
a wireless transmission processing circuit configured to transmit transmission data after transmitting the preamble signal in at least one or more frequency channels among a plurality of the frequency channels and transmit a plurality of the inter-training signals by utilizing one or a plurality of the frequency channels among the plurality of the frequency channels during a transmission period of the transmission data,
wherein the inter-training signal includes at least one of:
information regarding the frequency channels to be utilized for transmission of the transmission data,
information for identifying a wireless network to which the wireless communication apparatus belongs,
coding and modulation scheme information of a signal to be transmitted by the wireless transmission processing unit,
transmission power information, or
information regarding a spatial reuse technology.

2. The wireless communication apparatus according to claim 1,
wherein the inter-training signal includes a training sequence included in the preamble signal.

3. The wireless communication apparatus according to claim 1,
wherein the inter-training signal further includes information regarding the transmission period of the transmission data.

4. The wireless communication apparatus according to claim 1,
wherein the inter-training signal further includes at least one of receiving sensitivity information, or information regarding a wireless communication apparatus of a recipient of a signal.

5. The wireless communication apparatus according to claim 1,
wherein the wireless transmission processing circuit repeatedly transmits the inter-training signal by utilizing one of the frequency channels.

6. The wireless communication apparatus according to claim 1,
wherein the wireless transmission processing circuit switches the frequency channel to be utilized for transmission of the inter-training signal over time.

7. The wireless communication apparatus according to claim 1,
wherein the wireless transmission processing circuit transmits the inter-training signal before transmission of the transmission data or after transmission of the transmission data in one of the frequency channels.

8. The wireless communication apparatus according to claim 1,
wherein the wireless transmission processing circuit intermittently transmits the next inter-training signal after a predetermined period has elapsed since the inter-training signal had been transmitted.

9. The wireless communication apparatus according to claim 1,
wherein the wireless transmission processing circuit transmits the inter-training signal in one of the frequency channels in a case where the transmission data is transmitted using a plurality of the frequency channels.

10. A wireless communication method to be performed by a wireless communication apparatus, comprising:
generating a preamble signal including header information;
generating an inter-training signal including at least part of information of the header information; and
transmitting transmission data after transmitting the preamble signal in at least one or more frequency channels among a plurality of the frequency channels and transmitting a plurality of the inter-training signals by utilizing one or a plurality of the frequency channels among the plurality of the frequency channels during a transmission period of the transmission data,
wherein the inter-training signal includes at least one of:
information regarding the frequency channels to be utilized for transmission of the transmission data,
information for identifying a wireless network to which the wireless communication apparatus belongs,
coding and modulation scheme information of a signal to be transmitted by the wireless transmission processing unit,
transmission power information, or
information regarding a spatial reuse technology.

11. A non-transitory computer readable product containing a program for causing a computer to execute a method, the method:
generating a preamble signal including header information;
generating an inter-training signal including at least part of information of the header information; and
transmitting transmission data after transmitting the preamble signal in at least one or more frequency channels among a plurality of the frequency channels, and transmitting a plurality of the inter-training signals by utilizing one or a plurality of the frequency channels among the plurality of the frequency channels during a transmission period of the transmission data,
wherein the inter-training signal includes at least one of:
information regarding the frequency channels to be utilized for transmission of the transmission data,
information for identifying a wireless network to which the wireless communication apparatus belongs,
coding and modulation scheme information of a signal to be transmitted by the wireless transmission processing unit,
transmission power information, or
information regarding a spatial reuse technology.

12. A wireless communication apparatus comprising:
an inter-training detecting circuit configured to detect an inter-training signal including at least part of information of header information included in a preamble signal from a received signal in one or a plurality of frequency channels among a plurality of the frequency channels; and a wireless communication control circuit configured to specify usage situations of the plurality of frequency channels on a basis of the detected inter-training signal,
wherein the inter-training signal includes at least one of:
information regarding the frequency channels to be utilized for transmission of the transmission data,
information for identifying a wireless network to which the wireless communication apparatus belongs,
coding and modulation scheme information of a signal to be transmitted by the wireless transmission processing unit,
transmission power information, or
information regarding a spatial reuse technology.

13. The wireless communication apparatus according to claim 12,
wherein the inter-training signal further includes information regarding a transmission period of a signal.

14. The wireless communication apparatus according to claim 13,
wherein the wireless communication control circuit specifies the frequency channels which are available to the wireless communication apparatus on a basis of info' cation described in the inter-training signal and controls transmission of a signal utilizing the specified frequency channels.

15. The wireless communication apparatus according to claim 13,
wherein the wireless communication control circuit determines whether transmission right of a signal of the wireless communication apparatus is acquired, on a basis of information described in the inter-training signal.

16. The wireless communication apparatus according to claim 13,
wherein the wireless communication control circuit sets a period during which transmission of a signal of the wireless communication apparatus is inhibited on a basis of information described in the inter-training signal.

17. The wireless communication apparatus according to claim 12,
wherein the inter-training signal further includes at least one of receiving sensitivity information, or information regarding a wireless communication apparatus of a recipient of a signal.

18. The wireless communication apparatus according to claim 12, further comprising:
a transmission power control circuit configured to control transmission power of a signal of the wireless communication apparatus on a basis of information described in the inter-training signal.

19. A wireless communication method to be performed by a wireless communication apparatus, comprising:
detecting an inter-training signal including at least part of information of header information included in a preamble signal from a received signal in one or a plurality of frequency channels among a plurality of the frequency channels; and
specifying usage situations of the plurality of the frequency channels on a basis of the detected inter-training signal,
wherein the inter-training signal includes at least one of:
information regarding the frequency channels to be utilized for transmission of the transmission data,
information for identifying a wireless network to which the wireless communication apparatus belongs,
coding and modulation scheme information of a signal to be transmitted by the wireless transmission processing unit,
transmission power information, or
information regarding a spatial reuse technology.

20. A non-transitory computer readable product containing a program for causing a computer to execute a method, the method comprising:
detecting an inter-training signal including at least part of information of header information included in a preamble signal from a received signal in one or a plurality of frequency channels among a plurality of the frequency channels; and
specifying usage situations of the plurality of the frequency channels on a basis of the detected inter-training signal,
wherein the inter-training signal includes at least one of:
information regarding the frequency channels to be utilized for transmission of the transmission data,
information for identifying a wireless network to which the wireless communication apparatus belongs,
coding and modulation scheme information of a signal to be transmitted by the wireless transmission processing unit,
transmission power information, or
information regarding a spatial reuse technology.

* * * * *